United States Patent
Huang et al.

(10) Patent No.: US 9,637,562 B2
(45) Date of Patent: May 2, 2017

(54) **PROCESSES FOR RECOVERING RUBBER FROM AGED BRIQUETTES AND AGED BRIQUETTES CONTAINING PLANT MATTER FROM NON-*HEVEA* PLANTS**

(71) Applicant: Bridgestone Corporation, Tokyo (JP)

(72) Inventors: Yingyi Huang, Sagamore Hills, OH (US); Mark Smale, Hudson, OH (US); Robert White, Gilbert, AZ (US); Hiroshi Mouri, Bath, OH (US); William Cole, Clinton, OH (US)

(73) Assignee: Bridgestone Corporation, Tokyo (JP)

( * ) Notice: Subject to any disclaimer, the term of this patent is extended or adjusted under 35 U.S.C. 154(b) by 159 days.

(21) Appl. No.: 14/383,380

(22) PCT Filed: Mar. 6, 2013

(86) PCT No.: PCT/US2013/029449
§ 371 (c)(1),
(2) Date: Sep. 5, 2014

(87) PCT Pub. No.: WO2013/134429
PCT Pub. Date: Sep. 12, 2013

(65) Prior Publication Data
US 2015/0018459 A1    Jan. 15, 2015

Related U.S. Application Data

(60) Provisional application No. 61/661,052, filed on Jun. 18, 2012, provisional application No. 61/660,991, filed on Jun. 18, 2012, provisional application No. 61/661,064, filed on Jun. 18, 2012, provisional application No. 61/607,483, filed on Mar. 6, 2012, provisional application No. 61/607,469, filed on Mar. 6, 2012, provisional application No. 61/607,460, filed on Mar. 6, 2012, provisional application No. 61/607,448, filed on Mar. 6, 2012, provisional application No. 61/607,475, filed on Mar. 6, 2012.

(51) Int. Cl.
*C08C 2/02* (2006.01)
*C08L 97/02* (2006.01)

(52) U.S. Cl.
CPC ............. *C08C 2/02* (2013.01); *C08L 97/02* (2013.01); *C08L 2205/03* (2013.01)

(58) Field of Classification Search
CPC ......... C08C 2/02; C08L 97/02; C08L 2205/03
USPC ...................................... 524/9, 13; 526/335
See application file for complete search history.

(56) References Cited

U.S. PATENT DOCUMENTS

| | | |
|---|---|---|
| 702,678 A | 2/1902 | Prampolini |
| 741,258 A | 10/1903 | Lawrence |
| 814,407 A | 3/1906 | Von Stechow |
| 843,567 A | 2/1907 | Bradshaw |
| 957,495 A | 3/1909 | Chute et al. |
| 979,902 A | 9/1910 | Van der Linde |
| 999,493 A | 8/1911 | Ellis |
| 999,708 A | 8/1911 | Ellis |
| 1,003,139 A | 9/1911 | Kelley |
| 1,007,681 A | 11/1911 | Ellis |
| 1,051,987 A | 2/1913 | Chute |
| 1,103,903 A | 7/1914 | Kendall |
| 1,105,568 A | 7/1914 | Kendall |
| 1,135,236 A | 4/1915 | Wheeler et al. |
| 1,161,135 A | 11/1915 | Kaminski et al. |
| 1,167,264 A | 1/1916 | Brooks |
| 1,189,549 A | 1/1916 | Ellis |
| 1,189,550 A | 7/1916 | Ellis |
| 1,242,886 A | 10/1917 | Meyer |
| 1,247,814 A | 11/1917 | Garza |
| 1,550,319 A | 8/1925 | Hopkinson |
| 1,671,570 A | 5/1928 | Carnahan |
| 1,695,676 A | 12/1928 | Yeandle |
| 1,735,835 A | 11/1929 | Mccallum |
| 1,740,079 A | 11/1929 | Edison |
| 1,753,184 A | 4/1930 | Spence |
| 1,753,185 A | 4/1930 | Spence |
| 1,829,502 A | 10/1931 | Calcott et al. |
| 1,989,502 A | 10/1931 | Calcott et al. |
| 1,833,287 A | 11/1931 | Hadley |
| 1,903,500 A | 4/1933 | Calcott |
| 2,138,895 A | 12/1938 | Wiezevich |

(Continued)

FOREIGN PATENT DOCUMENTS

| | | |
|---|---|---|
| AU | 2012202924 A | 5/1942 |
| CN | 1442193 A1 | 4/2003 |

(Continued)

OTHER PUBLICATIONS

Gelling, I.R., Modification of Natural Rubber Latec with Peracetic Acid. Rubber Chemistry and Technology, vol. 58 pp. 86-96 (1985).
Keller, R.W., Winkler D.S., and Stephens, H.L., Degradative Effects of Guayule Resin on Natural Rubber. Rubber Chemistry and Technology. vol. 54, pp. 115-123, (1981).
King, R.J. and Mondimore, D.M., HLPC Procedure for the determination of free sulfur in natural rubber fomulations. Rubber Chemistry and Technology, vol. 60 pp. 716-720 (1987).

(Continued)

*Primary Examiner* — Frances Tischler
(74) *Attorney, Agent, or Firm* — Meredith E. Hooker; Jenny L. Sheaffer

(57) ABSTRACT

Provided herein are organic solvent-based processes for the removal of rubber from aged briquettes made from compressed plant matter (briquettes) of non-*Hevea* plants. Also provided are aged briquettes made from the compressed plant matter of non-*Hevea* plants where the briquettes have been aged for either various time period after formation and the rubber within the briquette has retained its a molecular weight to within a specified range.

21 Claims, No Drawings

(56) References Cited

U.S. PATENT DOCUMENTS

| | | |
|---|---|---|
| 2,187,146 A | 1/1940 | Calcott et al. |
| 2,281,336 A | 4/1942 | Stacom |
| 2,364,394 A | 12/1944 | Sibley |
| 2,373,689 A | 4/1945 | Kenda |
| 2,387,521 A | 10/1945 | Martin |
| 2,390,860 A | 12/1945 | Williams |
| 2,399,156 A | 4/1946 | Stamberger et al. |
| 2,408,853 A | 10/1946 | Hoover et al. |
| 2,410,780 A | 11/1946 | Gracia et al. |
| 2,410,781 A | 11/1946 | Gracia et al. |
| 2,425,011 A | 8/1947 | Smith |
| 2,434,412 A | 1/1948 | Jones |
| 2,459,369 A | 1/1949 | Tint et al. |
| 2,475,141 A | 7/1949 | Jones |
| 2,522,136 A | 9/1950 | Schaffer |
| 2,549,763 A | 4/1951 | Banigan, Jr et al. |
| 2,572,046 A | 10/1951 | Meeks et al. |
| 2,665,317 A | 11/1951 | Clark |
| 2,618,670 A | 11/1952 | Clark |
| 2,744,125 A | 5/1956 | Meeks et al. |
| 3,141,281 A | 7/1964 | Gaunt et al. |
| 3,311,601 A | 3/1967 | Batts |
| 3,376,158 A | 4/1968 | Buser |
| 4,107,902 A | 8/1978 | Suggs |
| 4,122,012 A | 10/1978 | Blasnik |
| 4,136,131 A | 1/1979 | Buchanan |
| 4,159,903 A | 7/1979 | Bauman |
| 4,198,324 A | 4/1980 | Lal et al. |
| 4,243,561 A | 1/1981 | Lal et al. |
| 4,246,001 A | 1/1981 | Bauman |
| 4,272,436 A | 6/1981 | Lal et al. |
| 4,363,188 A | 12/1982 | Lovelace et al. |
| 4,376,189 A | 3/1983 | Trivette et al. |
| 4,376,835 A | 3/1983 | Schmitt et al. |
| 4,376,853 A | 3/1983 | Gutierrez et al. |
| 4,405,532 A | 9/1983 | Gutierrez et al. |
| 4,410,656 A | 10/1983 | Coran et al. |
| 4,412,031 A | 10/1983 | Kitahara et al. |
| 4,412,041 A | 10/1983 | Kitahara et al. |
| 4,424,171 A | 1/1984 | Gutierrez et al. |
| 4,433,114 A | 2/1984 | Coran et al. |
| 4,434,266 A | 2/1984 | Trivette, Jr. |
| 4,435,337 A | 3/1984 | Kay et al. |
| 4,493,925 A | 1/1985 | Trivette, Jr. |
| 4,496,683 A | 1/1985 | Morita |
| 4,499,243 A | 2/1985 | Rader |
| 4,513,110 A | 4/1985 | Rader |
| 4,525,541 A | 6/1985 | Kitahara et al. |
| 4,526,929 A | 7/1985 | Kishida et al. |
| 4,526,959 A | 7/1985 | Kay et al. |
| 4,530,995 A | 7/1985 | Gutierrez et al. |
| 4,542,191 A | 9/1985 | Kay et al. |
| 4,557,306 A | 12/1985 | Graves |
| 4,559,378 A | 12/1985 | Kay et al. |
| 4,568,711 A | 2/1986 | Kay et al. |
| 4,570,690 A | 2/1986 | Graves |
| 4,585,826 A | 4/1986 | Graves |
| 4,591,631 A | 5/1986 | Beattie et al. |
| 4,591,632 A | 5/1986 | Moore |
| 4,609,336 A | 9/1986 | Stevenson et al. |
| 4,616,068 A | 10/1986 | Schloman, Jr. et al. |
| 4,616,075 A | 10/1986 | Malani et al. |
| 4,621,118 A | 11/1986 | Schloman, Jr. et al. |
| 4,622,365 A | 11/1986 | Scholman, Jr. et al. |
| 4,623,713 A | 11/1986 | Beinor et al. |
| 4,638,028 A | 1/1987 | Lui et al. |
| 4,647,607 A | 3/1987 | Kay et al. |
| 4,677,153 A | 6/1987 | Kitahara et al. |
| 4,678,860 A | 7/1987 | Kuester |
| 4,681,929 A | 7/1987 | Cole et al. |
| 4,684,715 A | 8/1987 | Kay et al. |
| 4,687,810 A | 8/1987 | Coran |
| 4,728,343 A | 3/1988 | Snyder |
| 4,739,037 A | 4/1988 | Kay et al. |
| 4,739,038 A | 4/1988 | Schloman, Jr. |
| 4,751,271 A | 6/1988 | Graves |
| 4,761,446 A | 8/1988 | Graves et al. |
| 4,762,870 A | 8/1988 | Graves et al. |
| 4,778,857 A | 10/1988 | Graves et al. |
| 4,786,683 A | 11/1988 | Schloman, Jr. et al. |
| 4,792,583 A | 12/1988 | Coran |
| 4,804,741 A | 2/1989 | Verbiscar et al. |
| 4,822,845 A | 4/1989 | Graves et al. |
| 4,829,117 A | 5/1989 | Schloman, Jr. et al. |
| 4,927,887 A | 5/1990 | Tate et al. |
| 4,975,497 A | 12/1990 | Tate et al. |
| 4,983,729 A | 1/1991 | Sikora |
| 4,988,388 A | 1/1991 | Schloman, Jr. |
| 5,247,009 A | 9/1993 | Kitahara |
| 5,272,203 A | 12/1993 | Joyner et al. |
| 5,306,862 A | 4/1994 | Chappell et al. |
| 5,321,111 A | 6/1994 | Wan |
| 5,362,807 A | 11/1994 | Nogura et al. |
| 5,473,024 A | 12/1995 | Thames et al. |
| 5,580,942 A | 12/1996 | Cornish |
| 5,599,868 A | 2/1997 | Bohm et al. |
| 5,616,075 A | 4/1997 | Winstanley et al. |
| 5,633,433 A | 5/1997 | Backhaus et al. |
| 5,651,953 A | 7/1997 | Yokoyama et al. |
| 5,717,050 A | 2/1998 | Cornish |
| 5,872,186 A | 2/1999 | Ang |
| 5,998,512 A | 12/1999 | Schloman, Jr. |
| 6,014,998 A | 1/2000 | Mowdood et al. |
| 6,054,525 A | 4/2000 | Schloman, Jr. et al. |
| 6,132,711 A | 10/2000 | Backhaus et al. |
| 6,231,970 B1 | 5/2001 | Andersen et al. |
| 6,399,673 B1 | 6/2002 | Thames et al. |
| 6,482,884 B1 | 11/2002 | Schaal et al. |
| 6,645,747 B1 | 11/2003 | Hallahan et al. |
| 6,734,245 B2 | 5/2004 | Baranek |
| 6,787,590 B2 | 9/2004 | Nakayama et al. |
| 6,818,676 B2 | 11/2004 | Koffler et al. |
| 7,026,678 B2 | 4/2006 | Coursey |
| 7,205,456 B2 | 4/2007 | Hallahan et al. |
| 7,259,231 B2 | 8/2007 | Cornish et al. |
| 7,540,438 B2 | 6/2009 | Buranov |
| 7,629,397 B2 | 12/2009 | McDonald et al. |
| 7,790,036 B2 | 9/2010 | Cornish et al. |
| 7,923,039 B2 | 4/2011 | Cornish et al. |
| 7,955,611 B2 | 6/2011 | Brown et al. |
| 8,013,213 B2 | 9/2011 | Mau et al. |
| 8,080,358 B2 | 12/2011 | Murakami |
| 8,241,873 B2 | 8/2012 | Diner et al. |
| 8,268,121 B2 | 9/2012 | Blount |
| 8,815,965 B2 | 8/2014 | Cole et al. |
| 9,138,660 B2 | 9/2015 | Yamamoto |
| 9,328,211 B2 | 5/2016 | Nemoto et al. |
| 2002/0006987 A1* | 1/2002 | Nakayama ............ C08L 101/00 524/27 |
| 2004/0265343 A1 | 12/2004 | Hill |
| 2005/0011812 A1 | 1/2005 | Nelson |
| 2005/0050759 A1 | 3/2005 | Chandran et al. |
| 2006/0070167 A1 | 4/2006 | Eng et al. |
| 2006/0106183 A1 | 5/2006 | Cornish et al. |
| 2006/0149015 A1 | 7/2006 | Cornish et al. |
| 2006/0217512 A1 | 9/2006 | Mau et al. |
| 2006/0218660 A1 | 9/2006 | Dong et al. |
| 2006/0225144 A1 | 10/2006 | Hallahan et al. |
| 2007/0265408 A1 | 11/2007 | Cornish et al. |
| 2007/0276112 A1 | 11/2007 | Buranov |
| 2008/0015336 A1 | 1/2008 | Cornish et al. |
| 2008/0172998 A1 | 7/2008 | Fraley et al. |
| 2008/0221246 A1 | 9/2008 | Imam et al. |
| 2008/0300526 A1 | 12/2008 | Gumbs |
| 2009/0054595 A1 | 2/2009 | Cornish et al. |
| 2009/0099309 A1 | 4/2009 | Gumbs |
| 2009/0099327 A1 | 4/2009 | Cornish et al. |
| 2009/0163689 A1 | 6/2009 | Cornish et al. |
| 2009/0191243 A9 | 7/2009 | Hill et al. |
| 2009/0199425 A1 | 8/2009 | Taylor |
| 2011/0021743 A1 | 1/2011 | Cornish et al. |
| 2011/0054051 A1 | 3/2011 | Cole et al. |

(56) References Cited

U.S. PATENT DOCUMENTS

| | | | |
|---|---|---|---|
| 2011/0275142 | A1 | 11/2011 | Wade et al. |
| 2014/0336288 | A1 | 11/2014 | Cole et al. |
| 2015/0184933 | A1 | 7/2015 | Huang et al. |

FOREIGN PATENT DOCUMENTS

| | | | |
|---|---|---|---|
| CN | 1860850 | A | 11/2006 |
| CN | 101671404 | A | 3/2010 |
| CN | 101906176 | A1 | 12/2010 |
| EP | 87109 | | 8/1983 |
| EP | 100434 | | 2/1984 |
| EP | 105822 | | 4/1984 |
| EP | 0164137 | A2 | 12/1985 |
| EP | 3164137 | A2 | 12/1985 |
| EP | 179211 | A1 | 4/1986 |
| EP | 180716 | A1 | 5/1986 |
| EP | 87109 | | 10/1986 |
| EP | 3039910 | B1 | 4/1987 |
| EP | 105822 | B1 | 6/1988 |
| EP | 180716 | B1 | 4/1989 |
| EP | 179211 | B1 | 7/1989 |
| EP | 100434 | B1 | 9/1989 |
| EP | 0164137 | B1 | 6/1990 |
| EP | 509768 | A2 | 10/1992 |
| EP | 491229 | B1 | 5/1995 |
| EP | 575202 | A1 | 10/1995 |
| EP | 476641 | B1 | 11/1995 |
| EP | D38350 | B1 | 9/1999 |
| EP | 1752277 | A2 | 2/2007 |
| EP | 2183303 | A1 | 5/2010 |
| EP | 1969036 | B1 | 3/2011 |
| GB | 545410 | A | 5/1942 |
| GB | 2164341 | A | 9/1984 |
| GB | 2174403 | A | 11/1986 |
| JP | 561264005 | A | 11/1986 |
| JP | 52000502 | A | 1/1987 |
| JP | H06100704 | | 4/1994 |
| JP | H08283309 | | 10/1996 |
| JP | H1112306 | A | 6/1997 |
| JP | 11012306 | A | 1/1999 |
| JP | H11-12036 | A | 1/1999 |
| JP | H11-012306 | A | 1/1999 |
| JP | 2003040902 | A | 2/2003 |
| JP | 2003313366 | A | 11/2003 |
| JP | 2006348067 | | 12/2006 |
| JP | 2007126676 | A | 5/2007 |
| JP | 2007224067 | | 9/2007 |
| WO | 8103255 | | 11/1981 |
| WO | 9803255 | A1 | 1/1998 |
| WO | 0110946 | A2 | 2/2001 |
| WO | 0149257 | | 12/2001 |
| WO | 2009054595 | A1 | 4/2009 |
| WO | 2009129249 | A3 | 10/2009 |
| WO | 2013-173625 | A1 | 6/2012 |
| WO | 201202924 | A1 | 6/2012 |
| WO | 2013-134430 | A1 | 9/2013 |
| WO | 2013134429 | A1 | 9/2013 |
| WO | 2013192182 | A1 | 11/2013 |
| WO | 2013192217 | A1 | 12/2013 |
| WO | 2015038707 | A1 | 3/2015 |

OTHER PUBLICATIONS

Kuester et al. Liquid Hydrocarbon Fuel Potential of Agricultural Materials. International Conference of Fundamentals of Thermochemical Biomass Conversion, 1982, Elsevier Applied Science: London, pp. 875-895 (1985).
Sin Stew Weng, Some Traditional and New Uses of Skim Rubber, Rubber Res. Inst. Malaysia, Proceedings of RRIM Planters Conference (1981).
Van Rysselberge, J., Utilisation De Bitumes Elastomeres (1976).
ASTM International, Standard Test Methods for Rubber from Natural Sources—Chemical Analysis, D 1278, (2002), pp. 246-251.
Curtis, Jr., Distribution of Rubber and Resins in Guayule. Plant Physiology, vol. 22, No. 4, Oct. 1947, pp. 333-359.
Doering. Guayule Rubber in Tires and Tubes, Service Tests in which the Rubber was Exclsively Guayule. Industrial and Engineering Chemistry, vol. 26 No. 5, pp. 541-43 (1934).
Makitra et al. Dependence of Natural Rubber Swelling Index Upon Organic Solvents Properties. Chemistry & Themical Technology, vol. 5, No. 1, 2011, pp. 19-24.
McIntyre et al. Guayule Rubber. Handbook of Elastomers, pp. 1-27, 2001.
International preliminary report on patentability and written opinion (PCT/US2009/040543) Athina Nickitas-Etienne; Oct. 10, 2010 (8 Pages).
International Search Report (PCT/US2009/040543) Hyunk Seok Kang; Nov. 9, 2009 (2 Pages).
Extended Search Report EP09733501, Aug. 19, 2001.
EP 09733501 Communication Pursuant to Article 94(3) EPC, May 10, 2012.
First office action in Chinese Application No. 2009801224454 dated Mar. 27, 2012.
Second office Action in Chinese Application No. 2009801224454 dated Jun. 27, 2012.
Response to Australian Office Action Dec. 23, 2013.
Response to EPO dated Apr. 9, 2013.
Notification of Intent to Grant from EPO dated Jun. 12 2013.
Decanters from GEA Wesffalia Separator, Mechanical Separation, GEA Westfalia Separator, www.westfalia-separator.com (2010).
G.M. Bedane, M.L. Gupta, D.L. George Development and Evaluation of a Guayule Debarker. Industrial Crops and Products. 34 (2011) 1256-1261. Elsevier.
R. J. Adler et al Freeze Coagulation of ABS Latex. Ind. Eng. Chem. Res. 36 (1997), pp. 2156-2162.
Bhowmick et al. Effect of Resin Components on the Degradation of Guayule Rubber. J. App. Polymer Science. vol. 30, 236702388 (1985).
Cataldo F. Guayule Rubber: A New Possible World Scenario for the Production of Natural Rubber. Progress in Rubber and Plastics Technology. vol. 16, No. 1, 2000.
Tanaka, Y. Structural Characterization of Natural Polyisoprenes: Solve the Mystery of Natural Rubber Based on Structural Study. Rubber Chemistry and Technology. vol. 74, 355, 2001.
Centrifugation and centrifuges, lenntech. Accessed Dec. 6, 2011 at http://www.lenntech.com/library/clarification/centrifugation.htm.
Extraction Decanters From Gea Wesffalia Separator, GEA Wesffalia Separator Group. Accessed: May 30, 2012 at http://www/wesffalia-separator.com/products/decanters/extraction-decanters.html.
Crown Model IV and Model V Extractors, Flyer, Crown Iron Works Company. Accessed Jul. 30, 2015 at http://www.crowniron.com/userfiles/image/specialty%20extractor%20insert1.pdf.
Screw press, wikipedia. Accessed May 28, 2012 at http://en.wikipedia.org/wiki/screwpress.
Biosolids Dewatering, Promotional Material, FKC Co. Ltd. Accessed Jul. 30, 2015 at http://www.fkcscrewpress.com/docs/fkcbiosolids2.pdf.
Screw Press Operating Hints (CC Series), Vincent Corporation. Accessed May 31, 2012 at http://www.vincentcorp.com/screw_press_operating_hints_%28cp%20series%29.
Stillage Dewatering Screw Press, Promotional Material, FKC Co. Ltd. Accessed Jul. 30, 2015 at http://www.fkcscrewpress.com/docs/spentgrain_stillageflyerweb.pdf.
Australian Patent Exam Report from Australian Patent Application No. 2009236328 dated Jul. 2, 2013.
Japanese Office Action from 2011-505140 dated Jan. 7, 2014.
Second Australian Patent Exam Report from 2009236328 dated Jan. 30 2014.
Belmares H. et al. New Rubber Peptizers and Coatings Derived from Guayule Resin, Industrial and Engineering Themistry: Product Research and Development, vol. 19, pp. 107-111 (1980).
Schloman, W. W. Jr. et al., Guayule Byproduct Evaluation: Extract Characterization, J. Agricultural and Food Chemistry, vol. 31, pp. 873-876 (1983).
Schloman, W. W. Jr. et al., Rubber Additives Derived from Guayule Resin, Industrial and Engineering Chemical Research, vol. 27, pp. 712-716 (1988).

(56) References Cited

OTHER PUBLICATIONS

Invitation pursuant to article 94(3) and rule 71(1) EPC dated Feb. 13, 2013.
Response to European Office Action dated Sep. 20, 2012.
Response to the Extended European Search Report dated Mar. 8, 2012.
International Search Report for WO 2013/134430 (PCT/US2013/029451) Kim, Dong Seok, dated Jun. 21, 2013.
International Preliminary Report on Patentability for WO 2013/134430 (PCT/US2013/029451) Kim, Dong Seok, dated Sep. 9, 2014.
International Search Report for WO 2013/134429 (PCT/US2013/029449) Athina Nickitas-Etienne, dated Sep. 9, 2014.
International Preliminary Report on Patentability for WO 2013/134429 (PCT/US2013/029449) Athina Nickitas-Eetienne, dated Sep. 9, 2014.
International Search Report for WO 2013/173625 (PCT/US2013/041422) Kim, Dong Seok, dated Aug. 5, 2013.
International Preliminary Report on Patentability for WO 2013/173625 (PCT/US2013/041422) Lindner, Nora, dated Nov. 18, 2014.
Third Party Objection for WO 20131173625 (PCT/US2013/041422) Anonymous, dated Aug. 8, 2014.
Buranov, A. et al., Rubber-bearing plants of Central Asia. Industrial Crops and Rural Development, AAIC and imida, Murcia, Spain. (Sep. 17, 2005).
Jordi Labs, Polymer Solubility Index. Accessed at http://www.lifescience.ca/data/catalogue/211~v~Polymer_Solubility_Index.pdf on May 8, 2014.
Schloman W. W. Jr. Processing Guayule for Latex and Bulk Rubber. Indust. Crops and Products. 22 (1) pp. 41-47 (2005).
International Search Report for WO 2013/192227 (PCT/US2013/046409) Heo, Joo Hyung, dated Oct. 16, 2013.
International Preliminary Report on Patentability for WO 2013/192227 (PCT/US2013/046409) Bai, Lingfei, dated Dec. 23, 2014.
International Search Report for WO 2013/192182 (PCT/US2013/046328) Kim, Dong Seok, dated Oct. 11, 2013.
International Preliminary Report on Patentability for WO 2013/192182 (PCT/US2013/046328) Lindner, Nora, dated Dec. 23, 2014.
International Search Report for WO 2013/192217 (PCT/US2013/046380) Kim, Dong Seok, dated Oct. 11, 2013.
International Preliminary Report on Patentability for WO 2013/192217 (PCT/US20131046380) Becamel, Philippe, dated Dec. 23, 2014.
Office Action issued in application No. CN201380031854. Issued on Sep. 11, 2015.
Office Action issued in application No. CN201380023740.0. Issued on May 26, 2015.
Office Action issued in application No. CN2013-80021313.9. Issued on Jun. 2, 2015.
Office Action issued in application No. CN2013-80021313.9. Issued on Nov. 3, 2015.
Extended European Search Report issued in application No. EP13758291.2. Issued Oct. 26, 2015.
Extended European Search Report issued in application No. EP13757665.5. Issued Oct. 26, 2015.
Office Action issued in application No. CN2013-80032056.9. Issued Sep. 6, 2015.
Office Action issued in application No. CN2013-80032039.5. Issued Sep. 1, 2015.
Office Action issued in application No. CN2013-80031854.X. Issued Sep. 11, 2015.
Office action dated Dec. 11, 2012 in U.S. Appl. No. 14/338,581.
Office action dated May 31, 2013 in U.S. Appl. No. 14/338,581.
Office action dated Nov. 13, 2013 in U.S. Appl. No. 14/338,581.
Office action dated May 13, 2013 in U.S. Appl. No. 14/338,581.
Response and RCE filed Oct. 30, 2013 in U.S. Appl. No. 14/338,581.
Response tiled Mar. 31, 2014 in U.S. Appl. No. 14/338,581.
Supplemental European Search Report in EP national stage from PCT/US2013/209451 dated Oct. 26, 2015.
Supplemental European Search Report in EP national stage from PCT/US2013/029449 dated Oct. 26, 2015.
Office Action issued in application No. CN2015121101372770. Dated Dec. 16, 2015.
Extended European Search Report issued in application No. EP13807611.2. Issued Oct. 26, 2015.
Third party observations submitted in PCT/US2013/041422 on Nov 21, 2014.
Schloman W. W. Jr. et al. Water Stress and Seasonal Effects on Rubber Quality in Irrigated Guayule, J. Agricultural and Food Chemistry v 34, pp. 683-685 (1986).
Schloman W. W. Jr. et al. Seasonal Effects on Guayule Resin Composition, J. Agricultural and Food Chemistry, v. 34 pp. 177-179 (1986).
T. R. Meeker; Specialty Isoprene Based Polymers—Derivatives from the General Purpose Polymers; Doc. 1848; Spring 1985.
Rubber Developments vol. 39 No. 1, pp. 23-24; Your Questions Answered (1986).
J. Brad Murphy and C.A. Stutte; Analysis for Substituted Benzoic and Cinnamic Acids Using High-Pressure Liquid Chromatography; Analytical Biochemistry 86, 220-28 (1978).
Himayah H. Naqvi and George P. Hanson; American Journal of Botany, vol. 69, No. 6 (Jul. 1982) pp. 985-989; Germination and Growth Inhibutors in Guayule Chaff and their Possible Influence in Seed Dormancy.
Subramaniam, A., J. Rubb. Res. Inst. Malaysia 25(2), 61-68; Estimation of Aldehyde Groups in Natural Rubber with 2,4-dinitrophenylhydrazine (1977).
G.F. Touzinsky; Northern Regional Research Center; Agricultural Research, Science and Education Administration; Guayule as a Source of Papermarking Fiber, 5th International Dissolving Pulps Coverence, Vienna, pp. 311-315 (1980).
Benedict, H.M. The Effect of Waste Products from the Guayule Rubber Mill on the Growth of Various Cros. J. American Society of Agronomy, vol. 40; pp. 1005-1016 (1948).
Bonner J. and A.W. Galston. Toxic Substances from the Culture Media of Guayule Which May Inhibit Growth. Botanical Gazette, vol. 106; pp. 189-196 (1944).
Chang M. and G.T. Tsao. Hydrolysis of Guayule Cellulose for Alcohol Production. Proceedings of the Third International Guayule Conference, Pasadena, CA, Guayule Rubber Soc. pp. 211-224 (1983).
Office action issued May 4, 2015 in U.S. Appl No. 14/383,379.
Response filed Jul. 31, 2015 in U.S. Appl. No. 14/383,379.
Notice of Allowance issued Aug. 19, 2015 in U.S. Appl. No. 14/383,379.
Notice of Allowance issued Feb. 29, 2016 in U.S. Appl. No. 14/383,379.
Response submitted Apr. 14, 2016 in EP application 13758291.
Office action issued Jan. 2016 in CN application 201380021313.9.
Examination report issued Feb. 2016 in AU application 2013230936.
Response filed May 2016 in AU application 2013230936.
Response filed Apr. 14, 2016 in EP application 13757665.8.
Third Office Action issued May 2016 in CN application 201380023740.0.
Examination Report issued Feb. 2016 in AU application 2013230935.
Response filed on Apr. 22, 2016 in AU application 2013230935.
Van Beillen, Jan. B., et al. "Guayule and Russian dandelion as alternative source of natural rubber," CRC Critical Reviews in Biotechnology, CRC Press, vol. 27, No. 1, Jan. 2007, pp. 217-231.
Examination report issued Mar. 2016 in AU application 2013262725.
Examination report issued May 2016 in AU application 2013277296.
Supplemental Search Report and opinion issued Feb. 2016 in EP application 13807847.2.
Supplemental Search Report and opinion issued Feb. 2016 in EP application 13806430.8.
Response filed Jun. 23, 2016 in EP application 13806430.8.
Examination Report issued Feb. 2016 in AU application 2013277286.

(56) References Cited

OTHER PUBLICATIONS

Response filed May 2016 in AU application 2013277286.
Supplemental Search Report and opinion issued Feb. 2016 in EP application 13807611.2.
Response filed May 19, 2016 in EP application 13807611.2.
Second Office Action issued May 2016 in CN application 201380032056.9.
pp. 408-410 from Rubber and Rubber-Plants book, ed. B.A. Keller, published 1936.
Presentation pages By Schloman, W.W., Jr. undated (submitted via third party observations in PCT/US2013/041422).
Reynolds, Cynthia, "The Russians are Coming," www2.macleans.ca/2011/08/11/the-russians-are-coming, Aug. 11, 2011.
Beintema, Nienke, Rubber From Dandelions and Shrubs, Wageningen World, No. 1, 2012, pp. 16-17.
Notice of allowance in U.S. Appl. No. 14/338,581 issued on Aug. 30, 2016.
Response filed in AU application 2013262725 (Sep. 12, 2016).
International Search Report with Written Opinion from PCT application No. PCT/US2014/055086, Feb. 5, 2015.
Office Action from U.S. Appl. No. 14/483,455, issued Apr. 27, 2016.
Response filed in U.S. Appl. No. 14/483,455, on Aug. 26, 2016.
Notice of allowance issued in U.S. Appl. No. 14/483,455 on Sep. 29, 2016.
Response submitted in EP application No. 13791244.0 on Aug. 30, 2016.
International Products Brochure 2007.
Kuester, J.L., Liquid Hydrocarbon Fuels From Biomass, 1981.
Abstract—Week 200365 Thomson Scientific, London. GB; AN2003-682828; XP000002567182, JP 2003 040902 A (Nitto Denko Corp) (dated Feb. 13, 2003).
Vincent Corporation, Screw Press Operating Hints, Sep. 17, 2009.
Buranov, Anvar U., et al., Extraction and Characterization of Latex and Natural Rubber from Rubber-Bearing Plants, J. Agric Food Chem., 2010, 58, pp. 734-743.
Extended European Search Report from application EP 09733501/EP2268675 dated Aug. 16, 2011.
Non-final Office Action issued in U.S. Appl. No. 12/937,284 on Dec. 11, 2012.
Response filed in U.S. Appl. No. 12/937,284 on Jun. 13, 2013.
Final Office Action issued in U.S. Appl. No. 12/937,284 on May 31, 2013.
Response filed in U.S. Appl. No. 12/937,284 on Oct. 30, 2013.
Non-final Office Action issued in U.S. Appl. No. 12/937,284 on Nov. 13, 2013.
Response filed in U.S. Appl. No. 12/937,284 on Mar. 31, 2014.
Notice of allowance issued in U.S. Appl. No. 12/937,284 on Apr. 16, 2014.
Non-final Office Action issued in U.S. Appl. No. 14/338,581 on Feb. 3, 2016.
Response filed U.S. Appl. No. 14/338,581 on Apr. 19, 2016.
Notice of Allowance issued in U.S. Appl. No. 14/338,581 on May 2, 2016.
RCE filed on Aug. 2, 2016 in U.S. Appl. No. 14/338,581.
Response filed in AU application 2013262725 (Aug. 10, 2016).
Second Office Action issued in CN application 20130031854.X (issued May 13, 2016).
Response filed in application EP 13791244.0 on Aug. 30, 2016.
Supplemental Search Report and opinion issued May 2016 in application EP 13791244.0.
Notice of allowance issued May 2016 in U.S. Appl. No. 14/409,132.
Response filed Jul. 1, 2016 in AU application 2013277296.
Supplemental Search Report and opinion issued Feb. 2016 in EP application 13807874.2.
Response submitted Jul. 12, 2016 in EP application 13807874.2.
Examination report issued May 2, 2016 in AU application 2013277335.
Response submitted Jul. 1, 2016 in AU application 2013277335.
Second Office Action issued May 2016 in CN application 201380032039.5.
International Preliminary Examination Report, with PCT Search Report and Written Opinion from PCT Application No. PCT/US2014/055086, 9 pages, Mar. 2016.
Second Examination report from AU application 2013262725, issued Aug. 23, 2016.
ICPI Workshop 2011. "Weed Washer" What is a Micron? (Micron v/s Mesh), available at http://www.fs.usda.gov/Internet/FSE_DOCUMENTS/stelprdb5366477.docx, accessed Aug. 2016.

\* cited by examiner

PROCESSES FOR RECOVERING RUBBER FROM AGED BRIQUETTES AND AGED BRIQUETTES CONTAINING PLANT MATTER FROM NON-*HEVEA* PLANTS

CROSS-REFERENCE TO RELATED APPLICATIONS

This application is a continuation of International Application Number PCT/US2013/029449, filed on Mar. 6, 2013, the entire disclosure of which is incorporated by reference herein, which claims priority to and any other benefit of U.S. Provisional Patent Application Ser. No. 61/607,448, filed Mar. 6, 2012, and entitled "PROCESSES FOR THE REMOVAL OF RUBBER FROM NON-HEVEA PLANTS," the entire disclosure of which is incorporated by reference herein; U.S. Provisional Patent Application Ser. No. 61/607,460, filed Mar. 6, 2012, and entitled "PROCESSES FOR THE PURIFICATION OF GUAYULE-CONTAINING SOLUTIONS," the entire disclosure of which is incorporated by reference herein; U.S. Provisional Patent Application Ser. No. 61/607,469, filed Mar. 6, 2012, and entitled "PROCESSES FOR THE REMOVAL OF BAGASSE FROM A GUAYULE-RUBBER CONTAINING SOLUTION," the entire disclosure of which is incorporated by reference herein; U.S. Provisional Patent Application Ser. No. 61/607,475, filed Mar. 6, 2012, and entitled "PROCESSES FOR RECOVERING RUBBER FROM NON-HEVEA PLANTS USING BRIQUETTES," the entire disclosure of which is incorporated by reference herein; U.S. Provisional Patent Application Ser. No. 61/607,483, filed Mar. 6, 2012, and entitled "AGED BRIQUETTES CONTAINING PLANT MATTER FROM NON-HEVEA PLANTS AND PROCESSES RELATING THERETO," the entire disclosure of which is incorporated by reference herein; U.S. Provisional Patent Application Ser. No. 61/660,991, filed Jun. 18, 2012, and entitled "AGED BRIQUETTES CONTAINING PLANT MATTER FROM NON-HEVEA PLANTS AND PROCESSES RELATING THERETO," the entire disclosure of which is incorporated by reference herein; U.S. Provisional Patent Application Ser. No. 61/661,064, filed Jun. 18, 2012, and entitled "PROCESSES FOR THE REMOVAL OF RUBBER FROM NON-HEVEA PLANTS," the entire disclosure of which is incorporated by reference herein; U.S. Provisional Patent Application Ser. No. 61/661,052, and entitled "PROCESSES FOR THE REMOVAL OF RUBBER FROM NON-HEVEA PLANTS," the entire disclosure of which is incorporated by reference herein.

BACKGROUND

The *Hevea* plant or tree (also called *Hevea brasiliensis* or a rubber tree) is a well-known source of natural rubber (also called polyisoprene). Rubber sources such as *Hevea brasiliensis*, *Ficus* elastic (India rubber tree) and *Cryptostegia grandiflora* (Madagascar rubbervine) produce natural rubber in the form of a sap where the rubber is suspended in an aqueous solution that flows freely and can be recovered by tapping of the plant. Various non-*Hevea* plants are also known to contain natural rubber, but their rubber is stored within the individual cells of the plant (e.g., stems, roots or leaves) and cannot be accessed by tapping but can only be accessed by breaking down the cell walls by physical or other means. Thus, processes for the removal of rubber from non-*Hevea* plants are generally more complicated and entailed than processes for harvesting rubber from *Hevea* trees. Additionally, because of the relatively low percentage of rubber contained within non-*Hevea* plants, considerable expense can be attributed to harvesting and transportation of the harvested plants to a facility where the natural rubber contained within the plant cells can be recovered.

SUMMARY

Provided herein are organic solvent-based processes for the removal of rubber from aged briquettes made from compressed plant matter of non-*Hevea* plants. Also provided are aged briquettes made from the compressed plant matter of non-*Hevea* plants where the briquettes have been aged for at least 90 days after formation and the rubber within the briquette has a molecular weight of at least 1,200,000.

In a first embodiment, organic solvent based methods for recovering rubber from aged rubber-containing briquettes made from chopped plant matter of a non-*Hevea* plant are provided. The methods comprise utilizing aged briquettes comprising plant matter that contains bagasse, rubber, resin and less than 5 weight % leaves of a non-*Hevea* plant, wherein the briquettes have been aged for about 21-200 days after formation. According to the methods, the briquettes are mixed with (i) at least one non-polar organic solvent and (ii) at least one polar organic solvent to produce a slurry where (i) and (ii) are present in the slurry in amounts at least sufficient to solubilize the resin and rubber from the plant matter. The total amount of (i) and (ii) combined is 50-90% by weight of the slurry, the briquettes comprise 10-50% by weight of the slurry, and the slurry contains 0.5-10 weight % water. Thereafter, a majority of the bagasse is removed from the slurry to produce a miscella. Optionally, additional polar organic solvent, non-polar organic solvent or a combination thereof (any of which may be the same or different than the at least one polar organic solvent and at least one non-polar organic solvent utilized to form the slurry) is added to the miscella to form a reduced viscosity miscella. The amount of additional polar organic solvent that is added to the miscella is less than the amount that causes the rubber contained within the reduced viscosity miscella to coagulate. Next, 80-95 weight % of bagasse (based on the total weight of bagasse present in the reduced viscosity miscella or the miscella) is removed from the reduced viscosity miscella or form the miscella to form a purified miscella. The majority of bagasse that is removed (from the reduced viscosity miscella or from the miscella) has a particle size of less than 105 microns. Optionally, the purified miscella is treated to remove additional bagasse thereby producing a clarified rubber solution that contains 0.01-1% by weight bagasse (based on the total amount of bagasse present in the slurry); 90-99% of the additional bagasse that is removed (from the reduced viscosity miscella) has a particle size greater than 45 microns. The relative amount of polar organic solvent as compared to non-polar organic solvent within the clarified rubber solution is increased so as to cause the rubber contained within the clarified rubber solution to coagulate. From the coagulated rubber, a solid purified rubber is produced. This solid purified rubber has a purity such that when it contains 0.8 weight % volatile matter, it also contains 0.05-0.5 wt % dirt, 0.2-1.5 wt % ash, and 0.1-4 wt % resin. Multiple aspects of the process are conducted at a temperature or temperatures of 10-80° C. (i.e., different aspects of the process may be conducted at the same temperature or at different temperatures) and a pressure of 35 to 1000 kPa.

A second embodiment (which may be used in the processes of the first embodiment or alternatively in other rubber recovery processes) provides an aged briquette made from non-*Hevea* plant matter where the briquette has been aged for 18-24 days after formation and the rubber within the briquette has a molecular weight of 1,000,000-1,500,000. (As discussed in more detail herein, it is intended that the molecular weight of the rubber within the briquette be measured after recovery of the rubber from the briquette, upon a solid form of the rubber, analyzed by GPC.) The aged briquette comprises: 78-95 weight % compressed chopped plant matter (based upon the total weight of the briquette) from a non-*Hevea* plant (the plant matter comprising bagasse, rubber, and resin), 2-20 weight % water (based upon the total weight of the briquette), 0.2-2 weight % antioxidant (based upon the total weight of rubber present in the bagasse), and 0.1-5 weight % binder.

DETAILED DESCRIPTION

Provided herein are methods for the improved recovery of rubber from non-*Hevea* plants utilizing compressed or briquetted forms of plant matter. Also provided are organic solvent-based processes for removing the rubber from the briquettes and aged briquette forms of compressed plant matter. For ease of description in certain sections, the methods and aged briquettes are described as embodiments; the use of this terminology is for ease of description only and should not be interpreted as limiting.

Definitions

The terminology as set forth herein is for description of the embodiments only and should not be construed as limiting the invention as a whole.

As used herein, the term "non-*Hevea* plant" is intended to encompass plants that contain natural rubber within the individual cells of the plant.

As used herein the term "bagasse" is used to refer to that portion of the ground or chopped plant matter from a non-*Hevea* plant that is insoluble and hence is suspended rather than dissolved by organic solvents. As used herein, bagasse should be understood to include dirt and ash, unless otherwise specified.

As used herein the term "plant matter" means material obtained from a non-*Hevea* plant. Unless otherwise specified, the plant matter may include roots, stems, bark, woody material, pith and leaves.

As used herein the term "woody material" means the vascular tissue and meristematic material obtained from a non-*Hevea* plant. Unless otherwise specified, woody material does not include bark.

As used herein the term "pith" is the inner-most region of the woody material of a non-*Hevea* plant.

As used herein the term "bark" refers to the tough outer covering present on the stems and roots of certain (particularly woody or shrub-like) non-*Hevea* plants and should be understood to include all tissues outside the vascular cambium. Not all non-*Hevea* plants will contain bark.

As used herein the term "resin" means the naturally occurring non-rubber chemical entities present in non-*Hevea* plant matter, including but not limited to resins (such as terpenes), fatty acids, proteins, and inorganic materials.

As used herein the term "dirt" (such as used in the connection with the solid purified rubber produced by the processes disclosed herein) means non-plant material that may be associated with non-*Hevea* plants, particularly upon harvesting, such as soil, sand, clay and small stones. Dirt content in solid purified rubber can be determined by completely re-dissolving the solid rubber and pouring the solution through a 45 micron sieve. The sieve is then rinsed with additional solvent and dried. The weight of the material retained on the sieve represents the "dirt" content of the solid purified rubber.

As used herein the term "ash" (such as used in the connection with the solid purified rubber produced by the processes disclosed herein) means the inorganic material (i.e., free of carbon) that remains after ashing the rubber at 550° C.±25° C.

As used herein, the term "majority" means more than 50% but less than 100%. In certain embodiments, the term means 51-60% and in other embodiments 60-95%.

As used herein, the phrase "volatile matter" refers to non-rubber matter that may be contained within a sample of solid-purified rubber, but which will volatilize at 100+/−5° C. (or 160+/−5° C. if the rubber sample is suspected to contain volatile hydrocarbon oils). A standard test for determining the volatile matter that is contained within a rubber sample is ASTM D1278-91 (1997).

Details

In a first embodiment, organic solvent-based methods for recovering rubber from aged rubber-containing briquettes made from chopped plant matter of a non-*Hevea* plant are provided. The methods comprise utilizing aged briquettes comprising chopped plant matter that contains bagasse, rubber, resin and less than 5 weight % leaves of a non-*Hevea* plant, wherein the briquettes have been aged for about 21-200 days after formation. According to the methods, the briquettes are mixed with (i) at least one non-polar organic solvent and (ii) at least one polar organic solvent to produce a slurry where (i) and (ii) are present in the slurry in amounts at least sufficient to solubilize the resin and rubber from the plant matter. The total amount of (i) and (ii) combined is 50-90% by weight of the slurry, the briquettes comprise 10-50% by weight of the slurry, and the slurry contains 0.5-10 weight % water. Thereafter, a majority of the bagasse is removed from the slurry to produce a miscella. Optionally, additional polar organic solvent, non-polar organic solvent or a combination thereof (any of which may be the same or different than the at least one polar organic solvent and at least one non-polar organic solvent utilized to form the slurry) is added to the miscella to form a reduced viscosity miscella. The amount of any additional polar organic solvent that is added to the miscella is less than the amount that causes the rubber contained within the reduced viscosity miscella to coagulate. Next, 80-95 weight % of bagasse (based on the total weight of bagasse present in the reduced viscosity miscella or in the miscella) is removed from the reduced viscosity miscella or form the miscella to form a purified miscella. (It should be understood that the reduced viscosity miscella and the miscella are referred to in the alternative in the preceding and following sentence for the sake of completeness, but that if the viscosity of the miscella is reduced, then the next removal step takes place on the reduced viscosity miscella whereas if the viscosity of the miscella is not reduced the next removal step takes place on the miscella.) The majority of bagasse that is removed (from the reduced viscosity miscella or from the miscella) has a particle size of less than 105 microns. The purified miscella is treated to remove additional bagasse thereby producing a clarified rubber solution that contains 0.01-1% by weight bagasse (based on the total amount of bagasse present in the slurry); 90-99% of the additional bagasse that is removed (from the reduced viscosity miscella) has a particle size greater than 45 microns. The relative amount of polar organic solvent as compared to non-polar organic solvent within the clarified rubber solution is increased so as to cause the rubber contained within the clarified rubber solution to coagulate. From the coagulated rubber, a solid purified rubber is produced. This solid purified rubber has a purity such that when it contains 0.8 wt % organic solvent, it also contains 0.05-0.5 weight % dirt, 0.02-1.5 weight % ash, and 0.1-4 weight % resin. Multiple aspects of the process are conducted at a temperature or temperatures of 10-80° C. (i.e., different aspects of the process may be conducted at the same temperature or at different temperatures) and a pressure of 35 to 1000 kPa.

A second embodiment (which may be used in the processes of the first embodiment or alternatively in other rubber recovery processes) provides an aged briquette made from non-*Hevea* plant matter where the briquette has been aged for 18-24 days after formation and the rubber within the briquette has a molecular weight of 1,000,000-1,500,000. (As discussed in more detail herein, it is intended that the molecular weight of the rubber within the briquette be measured after recovery of the rubber from the briquette, upon a solid form of the rubber, analyzed by GPC.) The aged briquette comprises: 78-95 weight % compressed chopped plant matter (based upon the total weight of the briquette) from a non-*Hevea* plant (the plant matter comprising bagasse, rubber, and resin), 2-20 weight % water (based upon the total weight of the briquette), 0.2-2 weight % antioxidant (based upon the total weight of rubber present in the bagasse) and 0.1-5 weight % binder.

Storage of the Briquettes

The following discussion of storage of the briquettes should be understood to be applicable to not only the second embodiment disclosed herein (in terms of storing the briquette after formation), but also to the first embodiment disclosed herein (either in terms of preparing and briquettes for use in the methods of the first embodiment or in terms of storing any briquettes that will ultimately be used in the methods of the first embodiment prior to their use in such methods). In certain embodiments disclosed herein, it may be helpful to store the briquettes in a controlled environment where the temperature of the briquettes is maintained at a temperature of less than 70° C., preferably less than 50° C. In certain embodiments, the temperature of the briquettes may be maintained at a temperature of 20-75° C., 20-50° C. or 20-25° C. Generally, the temperature of the briquettes is maintained by controlling the temperature of the air surrounding the briquettes.

In certain embodiments, it may be helpful to store the briquettes in a controlled environment where the relative humidity of the air surrounding the briquettes is maintained at 50 moisture or more. In certain embodiments, the relative humidity of the air may be maintained at 40-60%. In general, increased humidity or moisture can assist in maintaining the molecular weight of the rubber contained within the briquettes. Other methods for maintaining the briquettes in an increased humidity environment may be utilized such periodic spraying or misting of the briquettes with water. In certain embodiments, the spraying or misting is utilized on a weekly or every-other-week basis and a sufficient amount of water is applied to maintain the average water content of the briquettes at 10% by weight or greater (e.g., 10-20% by weight), preferably 15% by weight or greater (e.g., 15-20% by weight). In certain embodiments, it may be helpful to store the briquettes under inert gas (e.g., nitrogen) to avoid oxidation of rubber. In certain embodiments, the briquettes are stored in a controlled environment where both the temperature and relative humidity of the air surrounding the briquettes is maintained as discussed above. In other embodiments, the briquettes are stored in a controlled environment where both the temperature and atmosphere (i.e., inert gas) of the air surrounding the briquettes is maintained as discussed above. In yet other embodiments, the briquettes are stored in a controlled environment where both the atmosphere (i.e., inert gas) and relative humidity of the air surrounding the briquettes is maintained as discussed above. In yet other embodiments, the briquettes are stored in a controlled environment where the temperature, atmosphere and relative humidity is maintained as discussed above.

In certain embodiments according to the first embodiments described herein, the briquettes have been aged for 18-24 days after formation and prior to the preparation of a slurry utilizing the briquettes. As previously discussed, in the second embodiment disclosed herein, the briquettes are aged for 18-24 days after formation, thereby increasing the recoverable rubber content within the briquettes. In certain other embodiments of the first and second embodiments described herein, the briquettes are aged for other time periods such as 30 days or less, 60 days or less, or 90 days or less; in certain such embodiments, the period of aging is 10-30 days, 10-60 days, 10-90 days, or 18-30 days, 18-60 days or 18-90 days.

In certain embodiments, the briquettes have a density that is 150-325% higher than the density of the non-compressed chopped plant matter. Relatively higher densities of the briquettes can lead to reduced shipping and transportation costs as relatively more briquettes (and, hence more rubber) can be transported or stored within the same volume of shipping or storage container. In yet other embodiments according to the first and second embodiments described herein, the briquettes have a density that is 40-100% higher than the density of the non-compressed chopped plant matter. Briquettes with such densities can provide advantages in terms of being easier to produce and easier to grind and dissolve or in organic solvent. In certain embodiments according to the first and second embodiments described herein, the briquettes have a density of 3 to 8.5 pounds/gallon (0.4 to 1 kg/liter). This density is the true density of the briquettes (excluding the volume of pores) and not a bulk density. Various methods (e.g., optical, gas expansion and liquid imbibitions) for determining the true density of a porous solid exist and are known to those skilled in the art, but they all generally entail measuring the volume of pores existing within the porous solid so that this volume can be excluded from the volume that is used to calculate true density.

Plant Matter for the Briquettes

As previously mentioned, the briquettes utilized in the first and second embodiments described herein comprise chopped plant matter from non-*Hevea* plants that has been compressed. Exemplary non-*Hevea* plants useful in providing the plant matter for the briquettes, include, but are not limited to: *Parthenium argentatum* (Guayule shrub), *Taraxacum Kok-Saghyz* (Russian dandelion), *Euphorbia lathyris* (gopher plant), *Parthenium incanum* (mariola), *Chrysothamnus nauseosus* (rabbitbrush), *Pedilanthus macrocarpus* (candililla), *Asclepias syriaca, speciosa, subulata*, et al (milkweeds), *Solidago altissima, graminifolia rigida*, et al (goldenrods), *Cacalia atripilicifolia* (pale Indian plantain), *Pycnanthemum incanum* (mountain mint), *Teucreum canadense* (American germander) and *Campanula Americana* (tall bellflower). Other plants which produce rubber and rubber-like hydrocarbons are known, particularly among the Compositae, Euphorbiaceae, Campanulaceae, Labiatae, and Moracea families. When utilizing briquettes in the first and second embodiments disclosed herein, it is contemplated that one type of plant or a mixtures of more than one type of plant may be utilized to provide the plant matter.

In certain embodiments according to the first and second embodiments disclosed herein, the non-*Hevea* plant matter is obtained from at least one of: *Parthenium argentatum* (Guayule shrub), *Taraxacum Kok-Saghyz* (Russian dandelion), *Euphorbia lathyris* (gopher plant), *Parthenium incanum* (mariola), *Chrysothamnus nauseosus* (rabbitbrush), *Pedilanthus macrocarpus* (candililla), *Asclepias syriaca, speciosa, subulata*, et al (milkweeds), *Solidago altissima, graminifolia rigida*, et al (goldenrods), *Cacalia atripilicifolia* (pale Indian plantain), *Pycnanthemum incanum* (mountain mint), *Teucreum canadense* (American germander) and *Campanula Americana* (tall bellflower). In certain preferred embodiments according to the first and second embodiments disclosed herein, the chipped plant matter that is compacted into briquettes is obtained from guayule shrub (*Parthenium argentatum*).

Preparation of the plant matter

In certain embodiments of the first and second embodiments of the processes disclosed herein, the briquettes are made from plant matter that has been chopped or chopped into pieces with an average size of 1" or less. Generally, the chipping or chopping of the plant matter to a size of 1.5" or less or 1" or less may take place in one or more than one step. For example, the non-*Hevea* plant that is utilized may be rough chopped at the location of harvesting into pieces averaging less than 2" in length. Rough chopping may take place before or after the optional removal of leaves and soil (such as by shaking the plant or subjecting it to strong air currents), but is preferably after the removal of a large majority of leaves and soil from the harvested plant matter. Chipping or chopping into pieces with an average size of 1.5" or less or 1" or less may be achieved using various physical means. One exemplary way of obtaining chopped plant matter with an average size of 1.5" or less or 1" or less is to feed raw plant material (or optionally rough chopped plant matter) into a shredder, a granulator, a hammer mill or a roller mill. A granulator is a well-known machine designed for chopping or grinding material into various sizes. Most granulators contain multiple knives (often steel knives) and one or more screens (sometimes interchangeable) with various diameter holes to determine the size of the final product. Various size granulators exist and may be useful in chopping the plant matter such as those containing openings of 3/8", 1/4" and 1/8". A hammer mill can generally be described as a steel drum containing a vertical or horizontal rotating shaft or drum on which hammers are mounted; the hammers "pound" the material that is passed through the mill. Various size hammer mills exist and may be useful in chopping the plant matter such as those containing openings of 3/8", 1/4" and 1/8". A roller mill/cracker mill can generally be described as a device with two or more rolls each containing longitudinal grooves which assist in further size reduction of material fed through the mill. Various size roller mills exist and may be useful in chopping the plant matter such as those containing openings of 3/8", 1/4" and 1/8". In certain embodiments according to the first and second embodiments of the processes disclosed herein, the plant matter is subjected to at least one of a granulator, a shredder, a hammer mill, a roller mill and a flaker mill to produce chopped plant matter having an average size of 1" or less". In other embodiments according to the first and second embodiments of the processes disclosed herein, the plant matter is subjected to at least two of a shredder, a granulator, a hammer mill, a roller mill and a flaker mill to produce chopped plant matter having an average size of 1" or less.

In certain embodiments according to the first and second embodiments of the processes disclosed herein, the plant matter utilized in the slurry has not only been chopped or shredded (such as by treatment in a shredder, a roller mill, hammer mill and/or granulator) but has also been subjected to a flaker mill/flaker and/or other mechanical treatment capable of rupturing the cell walls of the cells that contain the natural rubber after briquetting but prior to being mixed into the slurry. A flaker mill or flaker can generally be described as a device with two or more rolls each having a smooth surface, usually operated at different speeds, with a defined and adjustable clearance between rolls which primarily assist in providing further rupturing of plant cell walls. Such types of mechanical treatment tend to increase the amount of natural rubber that can ultimately be recovered from the plant matter. In certain preferred embodiments of the first and second embodiments of the processes disclosed herein utilizing plant matter from guayule shrub, chopped plant matter is subjected to both roll milling and flake milling. In other embodiments of the first and second embodiments disclosed herein, chipped plant matter from the guayule shrub is used for the briquettes, and the chopped plant matter is subjected to at least one of roll milling, a shredder, a granulator and hammer milling prior to compression into a briquette and flake milling after briquetting (during but before preparation of the slurry). In those embodiments where at least one of roll milling, or hammer milling, a shredder, a granulator and flake milling is used upon the chopped plant matter, the chopped plant matter is preferably treated with at least one antioxidant prior to being compressed into a briquette (the amount of the antioxidant being in accordance with the previous antioxidant discussion).

In certain embodiments according to the first and second embodiments of the processes disclosed herein, it can be helpful to treat the chopped plant matter with an average size of 1.5" or less or 1" or less (such as exits a granulator) to remove undersize material before briquetting. The amount of undersize material that is generated may vary depending upon various factors including the method used to chop or chip the plant material and the speed at which the chopping or grinding takes place. One exemplary way of removing undersize material is to pass the chopped plant matter over a mesh screen that is then vibrated to allow undersize material to fall through the mesh. Various types of mesh screen may be utilized, depending upon the size of material that is classified as "undersize." In certain embodiments, a 30 mesh, 25 mesh, 20 mesh, 18 mesh or 16 mesh screen is utilized. The mesh rating of the screen corresponds to the number of openings per square inch. Hence a 20 mesh screen will have 20 openings in one square inch. The sizes of the openings in the listed mesh screens are as follows: 30 mesh (0.0232" openings or 595 micron openings); 25 mesh (0.0280" openings or 707 micron openings); 20 mesh (0.0331" openings or 841 micron openings); 18 mesh (0.0394" openings or 1000 micron openings); and 16 mesh (0.0469" openings or 1190 micron openings). Another exemplary way to remove undersize material is by using an air separator which functions to blow away or out undersize (and hence lighter) particles. Preferably when undersize material is removed (such as by a mesh screen), at least 90% by weight, even more preferably at least 95% by weight of the undersize material is removed. In certain embodiments, the plant material that is formed into briquettes has a size of 1/16" to 1.5", preferably 1/16 to 1", even more preferably 1/8"

to ½"; in certain such embodiments the plant material has been subjected to a process such as granulation that utilizes a screen having opening of 1/16" ⅛", ¼" or ½" thereby producing material having a maximum size of no bigger than the openings.

In certain embodiments according to the first and second embodiments disclosed herein, the plant matter that is compressed into the briquettes has not only been chipped but has also been subjected to a roller mill/cracker mill, flaker mill/flaker, hammer mill and/or other mechanical treatment capable of rupturing the cell walls of the cells that contain the natural rubber. A roller mill/cracker mill can generally be described as a device with two or more rolls each containing longitudinal grooves which assist in further size reduction of material fed through the mill. A flaker mill or flaker can generally be described as a device with two or more rolls each having a smooth surface, usually operated at different speeds, with a defined and adjustable clearance between rolls which primarily assist in providing further rupturing of plant cell walls. A hammer mill can generally be described as a steel drum containing a vertical or horizontal rotating shaft or drum on which hammers are mounted; the hammers "pound" the material that is passed through the mill. Such types of mechanical treatment tend to increase the amount of natural rubber that can ultimately be recovered from the plant matter. In certain embodiments of the first and second embodiments disclosed herein, chipped plant matter from the guayule shrub is used for the briquettes, and the chipped plant matter is subjected to at least one of roll milling, flake milling and hammer milling prior to compression into a briquette. In those embodiments where at least one of roll milling, flake milling or hammer milling is used upon the chipped plant matter, the chipped plant matter is preferably treated with at least one antioxidant prior to being compressed into a briquette (the amount of the antioxidant being in accordance with the antioxidant discussion herein).

The briquettes that are used in the first and second embodiments described herein may contain a certain amount of water. In certain embodiments according to the first and second embodiments of the processes described herein, the briquettes contain 2-20% by weight water (based upon the total weight of the briquette). In other embodiments the briquettes contain 5-15% by weight water. The water that is within the briquettes has as its primary source residual water from the plant matter. The amount of water present in the briquettes can be adjusted such as by drying the chipped plant matter prior to compacting it into briquettes. In certain embodiments of the first and second embodiments described herein, the chipped plant matter is dried to reduce its moisture content by at least 2 weight %, by at least 4 weight % or even by at least 6 weight % prior to compacting the plant matter into briquettes. Various methods of achieving drying of the chopped plant matter can be utilized, including, but not limited to, sun drying, forced air drying (with air that is dry and/or heated). In certain embodiments, the plant matter may be dried prior to chipping. Another potential source for the water that may be present in the briquettes is additives added to the plant matter after harvest. As discussed in more detail later, these additives can include antioxidants and/or binders that may optionally be applied via aqueous solutions of the active ingredients.

When the first and second embodiments disclosed herein make use of briquettes made of plant matter from a guayule shrub, the plant matter that is utilized may take various forms as described further herein. In certain embodiments, the plant matter comprises chopped guayule shrub including bark and woody tissue from the shrub but with no more than 5 weight %, preferably no more than 4 weight % or no more than 3 weight % or even more preferably no more than 1 weight % of the plant matter comprising leaves from the guayule shrub. In certain of the foregoing embodiments, the guayule shrub used for the plant matter initially comprises both the above-ground portions and below-ground portions of the shrub (i.e., the stems (with bark, woody tissue and pith) and the roots). In other of the foregoing embodiments, the guayule shrub used for the plant matter initially comprises only the above-ground portions of the shrub (in other words, the roots are not included in the plant matter). The leaves of the guayule shrub may be removed using various methods such as field drying followed by shaking. Other methods for removing the leaves from the plant matter of the guayule shrub before incorporating that plant matter into briquettes may occur to those of skill in the art and may be utilized as the particular method for removing leaves is not considered to be a significant limitation of the processes disclosed herein.

In certain embodiments according to the first and second embodiments described herein, the plant matter utilized in the briquettes contains bagasse, rubber and resin. In certain embodiments according to the first and second embodiments described herein, the plant matter utilized in the briquettes includes bark, woody material, rubber and resin. In certain embodiments according to the first and second embodiments described herein, woody material comprises at least 70 weight %, 80 weight %, at least 85 weight % or even at least 90 weight % of the briquette and the remaining amount of the briquette comprises bark and leaves. In order to achieve the foregoing make-up of plant matter within the briquette it may be necessary to remove or limit the amount of bark and leaves that is utilized within the plant matter and compacted into briquettes. In yet other embodiments according to the first and second embodiments described herein, bark comprises at least 50 weight %, at least 60 weight %, at least 70 weight % or even at least 80 weight % of the briquettes and the remaining amount of the briquettes comprise woody material and leaves. In order to achieve the foregoing make-up of plant matter within the briquettes it will likely be necessary to remove or limit the amount of woody material and leaves that is utilized within the plant matte and compacted into briquettes. In certain embodiments of the first and second embodiments described herein, the briquettes comprise at least 80% by weight bark, less than 20% by weight woody material and less than 1 weight % leaves. In order to achieve the foregoing make-up of plant matter within the briquettes it will likely be necessary to remove or limit the amount of woody material and leaves that is utilized within the plant matter and compacted into briquettes. In yet other embodiments of the first and second embodiments described herein, the briquettes contain less than 5 weight % or less woody material, with the remaining amount of the briquettes comprising up to 95 weight % bark and preferably less than 2 weight % leaves, even more preferably less than 1 weight % leaves. Each portion of the plant matter (i.e., bark, woody material and leaves) used within the briquettes will contain varying amounts of bagasse, rubber, resin and water.

Briquetting

As previously discussed, the first and second embodiments disclosed herein make use of compressed plant matter in the form of briquettes. The term briquette is meant to encompass various forms or shapes, including, but not limited to, pellets, cubes, rectangular solids, spherical solids, egg-shaped solids, bricks and cakes. Various methods exist for compacting the plant matter into briquettes. One method of preparing briquettes from the plant matter is to utilize a commercial briquetting machine to prepare the briquettes. Various companies manufacture these machines and they are available in various sizes and specifications. Exemplary briquetting machines include those manufactured by K.R. Komarek, Inc. (Wood Dale, Ill.), including the roll-type briquetting machines model no. B100R and BR200QC. Generally, a briquetting machine utilizes a roll-type system to compact material, with or without the addition of a binder to the material that is being compressed. Pressure can be applied by the machine in varying amounts depending upon the machine utilized, the properties of the chipped plant matter and the properties desired in the briquettes. In certain embodiments, according to the first and second embodiments disclosed herein, briquettes of plant matter from a guayule shrub are made using a briquetting machine. In certain of the foregoing embodiments, a binder is applied to the chipped plant matter prior to its being compressed into briquettes. Other methods of preparing briquettes of chipped plant matter from non-*Hevea* plants may occur to those of skill in the art and may be utilized within the scope of the processes disclosed herein.

In certain embodiments according to the first and second embodiments disclosed herein, the briquettes are made from chipped plant matter that has been treated with one or more binders prior to compression into briquettes. Various types of binders may be utilized, including, but not limited to, organic-based binders (such as wood products, clay, starches and ash), chemical-based binders (such as -sulfonate, lime, and sodiumbentonite and liquids such as water. The amount of binder utilized with the chipped plant matter may vary depending upon the type of briquette being formed. In certain embodiments, the amount of binder utilized with the briquette 0.1-5 weight % (based on the total weight of the briquette).

In certain embodiments according to the first and second embodiments disclosed herein, the briquettes are made from chipped plant matter that has been treated with one or more antioxidants prior to compression into briquettes. Suitable compounds for use as the one or more antioxidants in certain embodiments according to the first and second embodiments disclosed herein are well known to those skilled in the art and include, but are not limited to, 2,6-di-t-butyl-4-methyl-phenol (also known as 2,6-di-t-butyl-p-cresol); N-(1,3-dimethylbutyl)-N'-phenyl-1,4-benzenediamine; octadecyl-3-(3, 5-di-tert.butyl-4-hydroxyphenyl)-propionate (commercially available as Irganox® 1076); 4,6-bis(octylthiomethyl)-o-cresol (commercially available as Irganox® 1520), monohydric hindered phenols such as 6-t-butyl-2,4-xylenol, styrenated phenols, butylated octylphenols; bisphends, for example 4,4'-butylidenebis(6-t-butyl-m-cresol), polybutylated bisphenol A, hindered hydroquinones such as 2,4-di-t-amylhydroquinone; polyphenols, such as butylated p-cresol-dicyclopentadiene copolymer; phenolic sulfides such as 4,4'-thiobis(6-t-butyl-3-methyl-phenol), alkylated-arylated bisphenol phosphites such as tris(nonylphenyl) phosphite, triazinetriones such as alkylated hydroxycinnamate triester of tris(2-hydroxyethyl)-triazinetrione, tris (alkyhydroxybenzyl)-triazinetrione; pentaerythritol esters such as tetrakis(methylene-3,5-di-t-butyl-4-hydroxyhydrocinnamate)-methane; substituted diphenylamines such as octylated diphenylamines, p-(p-touenesulfonamido)-di-phenylamine, nonylated diphenylamine, diisobutylene-diphenylamine reaction products; dihydroquinolines such as 6-dodecyl-1,2-dihydro-2,2,4-trimethylquinoline; dihydroquinoline polymers such as 1,2-dihydro-2,2,4-trimethylquinoline polymer; mercaptobenz-imidazoles such as 2-mercaptobenzimidazole; metal dithiocarbamates such as nickel dibutyldithiocarbamate, nickel diisobutyldithiocarbamate, nickel dimethyldithiocarbamate; ketone/aldehyde-arylamine reaction products such as aniline-butyraldehyde condensation products, diarylamine-ketone-aldehyde reaction products; and substituted p-phenylenediamines such as di-b-naphthyl-p-phenylenephenylenediamine and N-phenyl-N'-cyclohexyl-p-phenylenediamine. The total amount of the antioxidant employed in those embodiments according to the first and second embodiments disclosed herein that utilize at least one antioxidant may be in the range of 0.2% to 2% by weight of the purified solid rubber ultimately produced by the process (based upon the weight of the purified solid rubber containing 0.8 weight % volatile matter).

In certain embodiments according to the first and second embodiments disclosed herein, the briquettes are capable of being stored for at least 90 days after compacting while still having the rubber contained within the briquettes retain a molecular weight of at least 800,000, preferably at least 1,000,000. In certain preferred embodiments according to the first and second embodiments disclosed herein, the briquettes are made of chipped plant matter from a guayule shrub and the briquettes are capable of being stored for at least 90 days after compacting while still having the rubber contained within the briquettes retain a molecular weight of at least 800,000, preferably at least 1,000,000. In other embodiments, according to the first and second embodiments disclosed herein, the briquettes are capable of being stored for at least 7 months (210 days) after compacting while still having the rubber contained within the briquettes retain a molecular weight of at least 800,000, preferably at least 1,000,000. In certain preferred embodiments according to the first and second embodiments disclosed herein, the briquettes are made of chipped plant matter from a guayule shrub and the briquettes are capable of being stored for at least 7 months (210 days) after compacting while still having the rubber contained within the briquettes retain a molecular weight of at least 800,000, preferably at least 1,000,000.

Recovery of Rubber from Briquetted Plant Matter

The following discussion of methods of recovering rubber from briquettes should be understood as generally applicable to both the first and second embodiments of the processes disclosed herein, wherein a slurry is prepared from briquetted non-*Hevea* plant matter. (Notably, as discussed above, the aged briquettes of the second embodiment can be utilized in organic solvent-based processes such as provided in the first embodiment, in alternative organic solvent-based processes or in other rubber recovery processes such as water-based recovery processes.) As previously discussed, in certain preferred embodiments, the non-*Hevea* plant matter is from guayule shrubs. All descriptions of plant matter (or briquettes) within this section should be understood to encompass the use of guayule plant matter (i.e., from guayule shrubs), even if the particular explanation does not explicitly state that guayule plant matter is being addressed.

Removal of Bagasse from the Slurry

According to the processes disclosed herein, a majority of the bagasse is initially removed from the slurry to produce a miscella (the slurry having been produced from the briquettes, as discussed above). (Weight percentages of bagasse referred to herein are based upon dry weights of bagasse (i.e., with any organic solvents and water having been removed). As discussed further below, the majority of the bagasse that is initially removed is in certain embodiments is 60-95 weight % of the bagasse contained within in the slurry, and in other embodiments 51-60 weight %, 60-80 weight %, 70-95 weight % or 75-95 weight %. The total amount of bagasse present in the slurry may be determined by taking a representative sample of the slurry—taking care to ensure there is no settling of the bagasse within the slurry prior to taking the sample—and extracting the insoluble materials by repeated rinsing and centrifuging. In other words, repeated rinsing and centrifuging of sediment followed by repeated centrifuging of each resulting supernatant to ensure complete removal of the insoluble bagasse materials. Three or more rounds of rinsing and centrifuging may be necessary. After condensing and drying of insoluble materials to remove organic solvents, the total weight of the insoluble materials can be determined. The amount of bagasse present in the sample can be calculated and by extension the total weight of bagasse present in the entire slurry can be calculated.) The miscella contains a certain amount of bagasse (i.e., the portion not removed from the slurry), solubilized rubber, solubilized resin, at least one polar organic solvent and at least one non-polar organic solvent. In certain embodiments of the processes disclosed herein, 60-95 weight % of the bagasse, 60-80 weight %, 70-95 weight % or 75-95 weight % of the bagasse is removed from the slurry to form the miscella. In certain preferred embodiments of the processes disclosed herein, at least 70 weight % or at least 75 weight % of the bagasse is removed from the slurry to form the miscella.

The removal of the bagasse from the slurry take may place by utilizing various equipment and/or processes and/or chemicals. The bagasse portion that is removed from the slurry is referred to herein as a first bagasse portion. In certain preferred embodiments of the processes disclosed herein, the removing of the bagasse from the slurry to produce a miscella is accomplished by using a centrifuge, optionally a decanter centrifuge. In other embodiments of the processes disclosed herein, the removing of the bagasse from the slurry to produce a miscella is accomplished using an extraction decanter or a screw press. In yet other embodiments of the processes disclosed herein, the removing of the bagasse from the slurry to produce a miscella is accomplished using a counter-current extractor. In certain embodiments of the processes disclosed herein, a portion or all of the first bagasse portion is fed back into the slurry so as to allow for transfer of additional solubilized rubber or resin that is associated with the solvent-wet bagasse into the liquid portion of the slurry (i.e., the miscella). In other embodiments of the processes disclosed herein, none of the first bagasse portion is fed back into the slurry. In certain embodiments of the processes disclosed herein, at least a portion of the miscella (containing solvents, rubber, resin and bagasse) that is produced from the slurry is fed back into the slurry. In other embodiments of the processes disclosed herein, none of the miscella is fed back into the slurry.

In certain embodiments, when a decanter centrifuge is utilized to remove bagasse from the slurry, it is operated at a speed sufficient to generate a g force of 500 to 3,500, preferably 1,000 to 3,000 or 1,000 to 2,500. (As those skilled in the art will understand g force is a measure of the amount of acceleration applied to a sample and is a function of rotations per minute and rotation radius.) It is also within the scope of the processes described herein to utilize more than one centrifuge to remove the majority of the bagasse from the slurry. In certain embodiments of the processes described herein, the solids content of the miscella that is produced by removing bagasse from the slurry is 5-20 weight %, preferably 7-18 weight % (based upon the total weight of the miscella), with solids being considered bagasse, rubber and resin. In certain embodiments according to the processes described herein, the miscella contains 1-10 weight % rubber and 1-10 weight % resin; in other embodiments the miscella contains 3-7 weight % rubber and 3-9 weight % resin.

As previously discussed, in certain particular embodiments of the processes disclosed herein, the slurry is subjected to a centrifuging process in order to remove 70-95 weight % bagasse (based on the total weight of bagasse in the slurry) to produce a miscella. The miscella contains bagasse, solubilized rubber, solubilized resin, at least one polar organic solvent and at least one non-polar organic solvent. In certain embodiments, the slurry is subjected to a centrifuging process in order to remove at least 75 weight % bagasse; in certain such embodiments, 75-95 weight % of the bagasse. In certain embodiments, the centrifuge is a decanter centrifuge, and in certain such embodiments it is operated at a speed sufficient to generate 500-3,500 g, preferably 1,000 to 3,000 g. It is also within the scope of the processes described herein to utilize more than one centrifuge to remove at least 70 weight % (e.g., 70-95 weight %) or at least 75 weight % (e.g., 75-95 weight %) bagasse from the slurry. In certain embodiments of the processes described herein, the solids content of the miscella that is produced by removing bagasse from the slurry is 5-20 weight %, preferably 7-18 weight % (based upon the total weight of the miscella), with solids being considered bagasse, resin and rubber. In certain embodiments of the processes disclosed herein, the miscella contains 1-10 weight % rubber and 1-10 weight % resin or; in other embodiments of the processes described herein, the miscella contains 3-7 weight % rubber and 3-9 weight % resin.

As previously discussed, in certain particular embodiments of the processes disclosed herein the slurry is subjected to an extraction process in order to remove 60-95% by weight bagasse (based on the total weight of bagasse present in the slurry), thereby producing a miscella. The extraction process may involve the use of an extraction decanter. An extraction decanter can be a scroll-type centrifuge (often horizontal) with a cylindrical conical solid-wall bowl. A scroll that is adapted to the bowl wall is located within the bowl and rotates therein. The suspension or slurry to be extracted is fed into the machine (often via distributor slots in the scroll of the bowl). The slurry or suspension then enters the counter-current extraction zone of the bowl and flows to the conical end of the bowl via a separating disc against the flow of an extraction agent that is added (i.e., counter-current effect). The use of certain extraction decanters can allow for the addition of additional solvent during the extraction process and may be operated in a continuous or semi-continuous manner. Various types of extraction decanters exist, including those that employ counter-current extractions, scroll-type decanters and screen bowl type and solid bowl type. Preferably, the extraction decanter utilized is a counter-current extractor. As used herein, the phrase extraction decanter should be understood to include various types of extraction decanters including counter-current extractors, scroll-type decanters, screen bowl type and solid bowl type. In certain embodiments, the slurry is subjected to an extraction process sufficient to remove at least 70 weight % bagasse. In certain embodiments, the extraction process consists of an extraction decanter. An extraction decanter can be operated at various settings, depending upon the size and parameters of the particular machine and the amount of bagasse that is to be removed. It is also within the scope of the processes described herein to utilize more than one extraction decanter to remove at least 70 weight % or at least 75 weight % bagasse from the slurry. In certain embodiments, the solids content of the miscella that exits the extraction decanter is 5-20 weight %, preferably 7-18 weight % (based upon the total weight of the miscella), with solids being considered bagasse, resin and rubber. In certain embodiments of the processes described herein, the miscella that exits the extraction decanter contains 1-10 weight % rubber and 1-10 weight % resin. In other embodiments of the processes described herein, the miscella contains 3-7 weight % rubber and 3-9 weight % resin. It is also specifically contemplated that the extraction process step (e.g., using an extraction decanter) with its removal of a portion of the bagasse contained within the slurry may be used in combination with the addition of additional solvent (i.e., polar organic solvent, non-polar organic solvent or a combination thereof) so as to provide a modified miscella that contains relatively less bagasse and, thus, has a solids content that is appropriate for processing via the next bagasse removal step (which, in certain embodiments, entails the use of a disc centrifuge). It should be appreciated that when the solids content of the material entering the disc centrifuge is relatively lower (e.g., in the range of 5-10 weight %), a relatively smaller disc centrifuge may be utilized.

As previously discussed, in certain particular embodiments of the processes disclosed herein, the slurry is subjected to a pressing process in order to remove at least 60% by weight bagasse (based on the total weight of bagasse present in the slurry), thereby producing a miscella. The pressing process may involve the use of a screw press. A screw press is a type of machine that contains a screw within a chamber the length of which is surrounded by cylindrical screen-like material. The screw is caused to turn which causes the material within the chamber to press through the chamber and up against the screen. The shaft of the screw may be larger in diameter towards the far end of the shaft so that the increasing diameter pushes the solid material toward the screen whereby liquid is expelled through the screen. Solid material is generally pushed along by the screw and may be pressed against the screen but does not pass through. As the screw continues to turn, a collection of solid material forms at the far end of the chamber. This solid material is often referred to as a press cake. At the far end of the chamber a plug or door is located (the plug or door is often called a cone). The cone is usually held shut by air pressure and the higher the air pressure, the harder the screw must push against the press cake to open and the more liquid that is expelled from the press cake. Most screw presses can be operated in a continuous fashion. In certain embodiments of the processes disclosed herein, the slurry is subjected to a pressing process sufficient to remove at least 70 weight % bagasse. In certain embodiments, the pressing process is accomplished by a screw press. In embodiments where a screw press is utilized, it is can be operated at various conditions depending upon the size and operating parameters of the particular screw press utilized. Various commercially available screw presses exist, including, but not limited to, those sold by Vincent Corporation (Tampa, Fla.).

In certain embodiments of the processes disclosed herein where a screw press is utilized it is operated at an rpm setting of 20-100 rpm, and at a back pressure of 5-15 psi (preferably 5-10 psi). It is also within the scope of the processes described herein to utilize more than one screw press or pass the bagasse through the screw press more than once (with addition of additional co-solvent to the bagasse press cake prior to any second pressing) to remove at least 70 weight % or at least 75 weight % bagasse from the slurry. In certain embodiments of the processes described herein, the solids content of the miscella that exits the press is 5-20 weight %, preferably 5-10 weight % (based upon the total weight of the miscella), with solids being considered bagasse, resin and rubber. In certain embodiments of the processes described herein, the miscella (liquor) that exits the press contains 1-10 weight % rubber and 1-10 weight % resin; in other embodiments, the miscella contains 3-7 weight % rubber and 3-9 weight % resin.

In certain embodiments of the processes disclosed herein, the removal bagasse from the slurry to produce a miscella is achieved by the use of a counter-current extractor. In certain embodiments, the bagasse removed by the counter-current extractor comprises 60-95% by weight of the bagasse that is contained within the slurry; in other embodiments 70-95% or even 75-95%. In certain embodiments utilizing the counter-current extractor, the bagasse and solvents mixture (i.e., the slurry) is mixed within a separate extractor for a period of time prior to use of the counter-current extractor, allowing for additional time for the solvent to contact the plant matter and solubilize the rubber and resins contained within the broken cells of the plant matter. In other embodiments, the bagasse and solvents mixture (i.e., the slurry) is not pre-mixed prior to being added to the counter-current extractor or is only pre-mixed just prior to being added to the counter-current extractor. A counter-current extractor works by the general principle of circulating or moving solids in one direction, while circulating or moving liquid (e.g., solvents) in the opposite direction, thereby increasing the amount of contact between solids and liquid. Various particular configurations of counter-current extractors are available and suitable for use in the processes disclosed herein.

In certain embodiments where a counter-current extractor is utilized, the plant matter that is mixed with the solvents to form the slurry is allowed to remain in contact with the solvents for a sufficient period of time to allow solubilization of the rubber and resin that is contained within the broken plant cells of the plant matter, prior to removing the majority of the bagasse from the counter-current extractor. In certain such embodiments, the plant matter is allowed to remain in contact with the solvents for 0.3-3 hours prior to removing the majority of the bagasse from the counter-current extractor; in other embodiments 0.5 hours-1.5 hours. It should be understood that the plant matter may be allowed to remain in contact with the solvents for longer period of time such as 1-8 hours or 3-8 hours prior to removing the majority of bagasse from the counter-current extractor. The contact periods of time referred to include both the (average) time that the plant matter is in contact with the solvents in the counter-current extractor, as well as any time that the plant matter is in contact with the solvents in the separate extractor, if such separate extractor is utilized.

In certain embodiments where a counter-current extractor is utilized, the counter-current extractor is configured such that it contains multiple levels or stages with each level or stage containing bagasse that has been subjected to the solvents for varying and increasing amounts of time. Within these stages, the bagasse is moved through the counter-current extractor by a conveyor belt, screw or another type of conveying apparatus. At what can be considered the final level or stage which is where the bagasse has been in contact with the solvent for the longest period of time, the bagasse is removed from the counter-current extractor (such as by the use of a screw, a conveyor belt or another type of conveying apparatus). In certain embodiments, the bagasse that is being removed from the counter-current extractor is subjected to rinsing with fresh solvent (i.e., the mixture of non-polar organic solvent and polar organic solvent) in order to remove at least part of the rubber that may be solubilized but is associated with the solvent-wet bagasse.

In certain embodiments where a counter-current extractor is utilized, the bagasse that is removed from the counter-current extractor contains both bagasse and solvent mixture in relative amounts of 40-80% by weight solvent; in other embodiments, the bagasse that is removed contains 40-60% by weight solvent or 40-50% by weight solvent. In certain embodiments where a counter-current extractor is utilized, the bagasse that is removed from the counter-current extractor is pressed or squeezed to remove additional solvent. This squeezing or pressing may be employed by one or more methods including, but not limited to, a screw press, tray drier, extrusion, devolatilization, etc.

Adding Additional Organic Solvents

As previously discussed, in certain embodiments of the processes disclosed herein, additional polar organic solvent, non-polar organic solvent or a combination thereof (each of which may be the same or different than the solvents present in the slurry) is added to the miscella to form a reduced viscosity miscella. The reduced viscosity miscella contains bagasse, solubilized rubber and resin as well as organic solvents. In certain preferred embodiments, any additional organic solvents added are the same as those contained within the slurry in order to simplify the process. The amount of any additional polar organic solvent that is added is less than the amount that causes the rubber contained within the reduced viscosity miscella to coagulate as the rubber should remain solubilized within the reduced viscosity miscella. As those skilled in the art will appreciate, the particular amount of any additional solvent(s) added will depend upon the volume of the miscella and the relative amounts of polar and non-polar organic solvents contained within the miscella as well as the particular subsequent processing to be performed upon the miscella to remove additional bagasse. In certain embodiments of the processes disclosed herein, the amount of additional solvent(s) added is an amount sufficient to produce a reduced viscosity miscella with a viscosity of less than 300 centipoise (e.g., 10-300 centipoise) and in other embodiments less than 200 centipoise (e.g., 10-200 centipoise). In certain embodiments, the step of adding additional polar organic solvent, additional non-polar organic solvent or a combination thereof is performed within the previous bagasse removal step and the viscosity of the miscella is such that it does not require further reduction. The general purpose behind reducing the viscosity of the miscella is to make it easier to remove smaller bagasse (e.g., fine bagasse finer than 105 microns and fine bagasse larger than 45 microns) in the subsequent steps of the process. As those skilled in the art will understand, the amount to which the viscosity of the reduced viscosity miscella is reduced (and accordingly, the amount of any additional organic solvent(s) added) will to a large extent be dictated by the parameters of the remaining steps of the process, including particularly the speed and/or number of steps by which smaller bagasse are removed to ultimately produce the coagulated rubber and solid purified rubber therefrom.

In certain embodiments of the processes described herein, the solids content of the reduced viscosity miscella or of the miscella/liquid material entering the next bagasse removal process is 2-18 weight %, preferably 5-15 weight % (based upon the total weight of the reduced viscosity miscella or of the miscella/liquid material), with solids including bagasse, rubber and resin. In certain embodiments according to the processes described herein, the reduced viscosity miscella (or the miscella) contains 0.5-7 weight % rubber and 0.5-8 weight % resin (based upon the total weight of the reduced viscosity miscella or the miscella).

As previously discussed, in certain embodiments of the processes disclosed herein, additional polar organic solvent, non-polar organic solvent or a combination thereof (each of which may be the same or different than the organic solvents present in the slurry) is added to the miscella to form a reduced viscosity miscella with a viscosity lower than 200 centipoise (e.g., 10-200 centipoise). In other embodiments, additional polar organic solvent, non-polar organic solvent or a combination thereof is added to the miscella to form a reduced viscosity miscella with a viscosity lower than 300 centipoise (e.g., 10-300 centipoise). One or more than one organic solvent may be added. One or more than one polar organic solvent may be added. One or more than one non-polar organic solvent may be added. The reduced viscosity miscella contains bagasse, solubilized rubber and resin as well as organic solvents. In certain preferred embodiments, additional polar organic solvent is added to the miscella to form the reduced viscosity miscella. In certain preferred embodiments, any additional polar organic solvent is added that is the same as the at least one polar organic solvent contained within the slurry in order to simplify the process. The amount of any additional polar organic solvent that is added is less than the amount that causes the rubber contained within the reduced viscosity miscella to coagulate as the rubber should remain solubilized within the reduced viscosity miscella. As those skilled in the art will appreciate, the particular amount of additional organic solvent(s) added will depend upon the volume of the miscella and the relative amounts of polar and non-polar organic solvents contained within the miscella. The general purpose behind reducing the viscosity of the miscella is to make it easier to remove smaller bagasse (e.g., fine bagasse finer than 105 microns and fine bagasse larger than 45 microns) in the subsequent steps of the process. As those skilled in the art will understand, the amount to which the viscosity of the reduced viscosity miscella is reduced (and accordingly, the amount of additional organic solvent(s) added) will to a large extent be dictated by the parameters of the remaining steps of the process, including particularly the speed and/or number of steps by which smaller bagasse are removed to ultimately produce the coagulated rubber and solid purified rubber therefrom. In certain embodiments according to the processes described herein, the solids content of the reduced viscosity miscella or of the liquid material entering the next bagasse removal process is 2-18 weight %, preferably 5-15 weight % (based upon the total weight of the reduced viscosity miscella), with solids including bagasse, rubber and resin. In certain embodiments of the processes described herein, the reduced viscosity miscella contains 0.5-7 weight % rubber and 0.5-8 weight % resin (based upon the total weight of the reduced viscosity miscella).

Second Removal of Bagasse

As should be clear from the previous discussion of the processes disclosed herein, after the miscella is produced by removing a majority of the bagasse from the slurry, additional bagasse remains within the miscella, a portion of which must be removed in order to produce a commercially acceptable final rubber product. As previously discussed, in certain embodiments of the processes disclosed herein, 80-95 weight % bagasse (based on the total weight of bagasse present in the reduced viscosity miscella or the miscella from which a majority of bagasse has been removed) is removed from the reduced viscosity miscella or from the miscella to form a purified miscella. A majority of the bagasse that is removed to form the purified miscella has a particle size less than 105 microns. (In other words, at least 50% by weight of the bagasse that is removed has a particle size less than 105 microns and in certain embodiments at least 90% or 95% by weight of the bagasse that is removed has a particle size less than 105 microns. The particle size range of the bagasse that is removed can be determined by drying the bagasse to remove organic solvents and then subjecting the dried mass to particle size analysis such as by sieve analysis. Various methods for particle size analysis are well known to those skilled in the art.) The purified miscella contains solubilized rubber and resin as well as organic solvents. In certain embodiments of the processes disclosed herein, at least 85 weight % (e.g., 85-95 weight %) or at least 90 weight % (e.g., 90-95 weight %) bagasse is removed to form the to form a purified miscella. In certain preferred embodiments according to the processes disclosed herein, the removing of additional bagasse to produce the further purified miscella is accomplished by using a centrifuge, optionally a disk centrifuge. In certain embodiments, when a disk centrifuge is utilized, it is operated at a speed sufficient to generate a g force of 4,000 to 12,000, preferably 7,000 to 10,000. It is also within the scope of certain embodiments of the processes described herein to utilize more than one centrifuge or more than one treatment method to remove the additional bagasse to produce the purified miscella. In certain embodiments of the processes described herein, the solids content of the purified miscella is 2-16 weight %, preferably 3-12 weight % (based upon the total weight of the purified miscella), solids including rubber, resin and bagasse. In certain embodiments according to the processes described herein, the purified miscella contains 0.5-7 weight % rubber and 0.5-8 weight % resin (based upon the total weight of the purified miscella).

Further Purification of the Purified Miscella

As previously discussed, optionally certain embodiments of the processes disclosed herein, the purified miscella is treated to remove additional bagasse thereby producing a clarified rubber solution that contains 0.01-1% bagasse (based on the total weight of bagasse present in the slurry). In certain such embodiments, 0.01-0.5% bagasse or even 0.01-0.1% bagasse (based on the total weight of bagasse present in the slurry) remains in the clarified rubber solution. 90-99% (by weight) of the additional bagasse that is removed (from the purified miscella) has a particle size greater than 45 microns and in other embodiments, 95-99% by weight of the additional bagasse that is removed has a particle size greater than 45 microns. The clarified rubber solution contains solubilized rubber and solubilized resin (from the plant matter) as well as polar and non-polar organic solvent. In certain preferred embodiments, the removing of additional bagasse from the purified miscella is accomplished by filtering, optionally by the use of a screen-bar element type-filter containing openings of 45 microns or less, continuously scraped by a rotating blade. Screen-bar element type filters are characterized by a screen filter with opening of a specified size through which fluid is passed. Solids larger than the openings are caught by the screen filter and removed from the screen filter by scraping such as by a rotating blade. The solids can then fall to the bottom of the filter apparatus where they can be collected and/or discharged periodically. Other processes, including, but not limited to other filtering methods, may be used to remove additional bagasse from the purified miscella to produce a clarified rubber solution that contains 0.01-1% bagasse (based on the total weight of bagasse present in the slurry). It is also within the scope of the processes described herein to utilize more than one filter or more than one treatment method to remove the additional bagasse thereby producing a clarified rubber solution that contains 0.01-1% bagasse (based on the total weight of bagasse present in the slurry).

Organic Solvents

In any of the embodiments of the processes disclosed herein, the organic solvents contained within the slurry and any additional organic solvents (polar organic solvent, non-polar organic solvent, or a combination thereof) added to the miscella to form a reduced viscosity miscella or elsewhere in the process may be the same or different (i.e., overall one non-polar organic solvent may be utilized and overall one polar organic solvent may be utilized, or alternatively more than one of each maybe be utilized). Preferably, all non-polar organic solvent utilized within the process are the same and all polar organic solvent utilized within the process are the same.

In any of the foregoing embodiments of the processes disclosed herein, the at least one polar organic solvent of the slurry and any additional polar organic solvent added to the miscella to form a reduced viscosity miscella or added elsewhere in the process may be selected from the group consisting of alcohols having 1 to 8 carbon atoms (e.g., ethanol, isopropanol, ethanol and the like); ethers and esters having from 2 to 8 carbon atoms; cyclic ethers having from 4 to 8 carbon atoms; and ketones having from 3 to 8 carbon atoms (e.g., acetone, methyl ethyl ketone and the like); and combinations thereof. In certain preferred embodiments of the processes disclosed herein, the at least one non-polar organic solvent and any additional non-polar organic solvent are each hexane or cyclohexane with the at least one polar organic solvent and any additional polar organic solvent optionally being acetone. Other polar organic solvents (individually or in combination) may be used in embodiments of the processes disclosed herein as long as the polar organic solvent preferentially solvates a portion of non-rubber extractables (e.g., resins) and acts (at a certain concentration) to coagulate natural rubber. In any of the embodiments of the processes disclosed herein, mixtures of two or more polar organic solvents may be utilized.

In any of the foregoing embodiments of the processes described herein, the at least one non-polar organic solvent that is contained within the slurry and any additional non-polar organic solvent added to the miscella to form a reduced viscosity miscella or elsewhere in the process may be selected from the group consisting of alkanes having from 4 to 9 carbon atoms (e.g., pentane, hexane, heptanes, nonane and the like); cycloalkanes and alkyl cycloalkanes having from 5 to 10 carbon atoms (e.g., cyclohexane, cyclopentane and the like); aromatics and alkyl substituted aromatics having from 6 to 12 carbon atoms (e.g., benzene, toluene, xylene and the like); and combinations thereof. In certain preferred embodiments according of the processes disclosed herein, the at least one polar organic solvent of the slurry and any additional polar organic solvent are each acetone, and the at least one non-polar organic solvent of the slurry and any additional non-polar organic solvent are optionally hexane or cyclohexane. Other non-polar organic solvents (individually or in combination) may be used in embodiments of the processes disclosed herein as long as the non-polar organic solvent preferentially solvates natural rubber. In any of the embodiments of the processes disclosed herein, mixtures of two or more non-polar organic solvents may be utilized.

As previously discussed, in certain embodiments of the processes described herein, the relative amount of at least one non-polar organic solvent and at least one polar organic solvent contained within the slurry is 50-90% by weight and 10-50% by weight, respectively, based upon the total amount of organic solvent. In certain preferred embodiments, the amount of the at least one non-polar organic solvent is 60-85% by weight and the amount of the at least one polar organic solvent is 15-40% by weight. In certain embodiments of the processes disclosed herein, it is advantageous to control or adjust the viscosity of the combined organic solvent mixture (i.e., the at least one non-polar organic solvent and the at least one polar organic solvent) to 10-1000 centipoise, particularly for certain portions of the process such as the slurry portion where rubber and resin are being solubilized from the ruptured cells of the plant. In certain such embodiments, the viscosity of the combined organic solvent mixture is controlled or adjusted to 35-800 centipoise. Relatively higher viscosities within the foregoing ranges will be useful for a portion of the process where rubber and resin solubilization from the ruptured cells of the plant is occurring so as to maximize solubilization and minimize settling of bagasse particles. Conversely, a relatively lower viscosity within the foregoing ranges will be useful for a portion of the process where rubber and resin have already been solubilized, but the bagasse is being washed to ensure that solubilized rubber and resin are retained with the liquid/solvent instead of with the solvent-wet bagasse.

Miscellaneous

In various embodiments according to the processes disclosed herein, one or more antioxidants may optionally be utilized along with the plant matter, the slurry or elsewhere in the process of removing rubber from the plant matter. In preferred embodiments of the processes disclosed herein, one or more antioxidant are added to the clarified rubber solution before the relative amount of polar organic solvent as compared to non-polar organic solvent is increased. However, in other embodiments of the processes disclosed herein, one or more antioxidants may be added at one or more other points during the process. Preferably, when one or more antioxidants are added, they are added after removal of the at least 80%, at least 85% or at least 90% bagasse from the reduced viscosity miscella. Alternatively, in certain embodiments of the processes disclosed herein, one or more antioxidants may be added to the plant matter prior to its incorporation into the slurry. Suitable compounds for use as the one or more antioxidants in the processes disclosed herein include, but are not limited to, 2,6-di-t-butyl-4-methylphenol (also known as 2,6-di-t-butyl-p-cresol); N-(1,3-dimethylbutyl)-N'-phenyl-1,4-benzenediamine; octadecyl-3-(3,5-di-tert.butyl-4-hydroxyphenyl)-propionate (commercially available as Irganox® 1076); 4,6-bis(octyl-thiomethyl)-o-cresol (commercially available as Irganox® 1520), monohydric hindered phenols such as 6-t-butyl-2,4-xylenol, styrenated phenols, butylated octylphenols; bisphenols, for example 4,4'-butylidenebis(6-t-butyl-m-cresol), polybutylated bisphenol A, hindered hydroquinones such as 2,4-di-t-amylhydroquinone; polyphenols, such as butylated p-cresol-dicyclopentadiene copolymer; phenolic sulfides such as 4,4'-thiobis(6-t-butyl-3-methyl-phenol), alkylated-arylated bisphenol phosphites such as tris(nonylphenyl) phosphite, triazinetriones such as alkylated hydroxycinnamate triester of tris(2-hydroxyethyl)-triazinetrione, tris (alkyhydroxybenzyl)-triazinetrione; pentaerythritol esters such as tetrakis(methylene-3,5-di-t-butyl-4-hydroxyhydrocinnamate)-methane; substituted diphenylamines such as octylated diphenylamines, p-(p-touenesulfonamido)-di-phenylamine, nonylated diphenylamine, diisobutylene-diphenylamine reaction products; dihydroquinolines such as 6-do-decyl-1,2-dihydro-2,2,4-trimethylquinoline; dihydroquinoline polymers such as 1,2-dihydro-2,2,4-trimethylquinoline polymer; mercaptobenz-imidazoles such as 2-mercaptobenzimidazole; metal dithiocarbamates such as nickel dibutyldithiocarbamate, nickel diisobutyldithiocarbamate, nickel dimethyldithiocarbamate; ketone/aldehyde-arylamine reaction products such as aniline-butyraldehyde condensation products, diarylamine-ketone-aldehyde reaction products; and substituted p-phenylenediamines such as di-b-naphthyl-p-phenylenephenylenediamine and N-phenyl-N'-cyclohexyl-p-phenylenediamine. The total amount of the antioxidant employed in those embodiments of the processes disclosed that utilize at least one antioxidant herein may be in the range of 0.2% to 2% by weight of the purified solid rubber ultimately produced by the process (based upon the weight of the purified solid rubber containing less than 0.5 weight % solvent).

As previously discussed, the relative amount of polar organic solvent as compared to non-polar organic solvent within the clarified rubber solution is increased so as to coagulate the rubber that is solubilized within the clarified rubber solution. In certain embodiments, the amount of polar organic solvent is increased by adding additional polar organic solvent. In other embodiments, the relative amount of polar organic solvent is increased by removing non-polar organic solvent. The relative amount of polar organic solvent is increased to an extent that causes the rubber contained within the clarified rubber solution to begin to coagulate. The particular amount of additional polar organic solvent that is added and/or the particular amount of non-polar organic solvent that is removed will depend upon the volume of the miscella and the relative amounts of polar and non-polar organic solvents contained within the miscella and upon the amount of rubber coagulation desired. Higher molecular weight rubber (which is generally more desirable in terms of a final product) will coagulate first. In certain embodiments, coagulation is controlled so that higher molecular weight rubber (preferably rubber with a molecular weight of at least 800,000 (e.g., 800,000-1,500,000), even more preferably at least 1,000,000 (e.g., 1,000,000-1,500,000)) coagulates and lower molecular weight rubber remains in solution. The molecular weights of rubber that are referred to herein are determined by GPC, utilizing a polystyrene standard.

In certain embodiments of the processes disclosed herein, it may be helpful to allow for some amount of settling time so that the fraction containing higher molecular weight rubber can separate from the lighter fraction containing lower molecular weight rubber and also resin. In certain embodiments of the processes disclosed herein, a fractionator (optionally cone-shaped) may be utilized to assist in the separation whereby the heavier, higher molecular weight rubber fraction settles at the bottom of the fractionators and can be removed (such as by pumping) from the bottom. In certain embodiments of the processes disclosed herein, the removal of the higher molecular weight rubber fraction is continuous so as to maintain a constant or relatively constant phase interface within the fractionator. The upper phase (containing lower molecular weight rubber and resin) can be separated and may be recycled or re-used in various ways. In certain embodiments, the relative amount of polar organic solvent as compared to non-polar organic solvent can be increased by both adding additional polar organic solvent and removing non-polar organic solvent. In certain embodiments, one or more than one additional polar organic solvent can be added to the clarified rubber solution in a total amount so as to coagulate the rubber solubilized therein. In preferred embodiments, when additional polar organic solvent is added, it is the same polar organic solvent as is contained within the slurry. In other embodiments according, when additional polar organic solvent is added, it may be a different polar organic solvent than is contained within the slurry.

As previously discussed, according to the processes disclosed herein, solid purified rubber can be produced from the coagulated rubber that coagulates in the clarified rubber solution. Various processes can be utilized for isolating the solid purified rubber. These processes generally comprise removal of solvent (primarily non-polar organic solvent but also some polar organic solvent) associated with the coagulated rubber. Residual solvent can be removed from the coagulated rubber by evaporating the solvent such as with the application of heat and/or vacuum. In certain embodiments of the processes disclosed herein, the residual solvent is removed in one or multiple phases (two, three, four, five or more) that include the use of both heat and vacuum. In certain embodiments, heat that is applied preferably raises the temperature of the coagulated rubber to above the boiling point of the residual organic solvents associated with the coagulated rubber. In certain embodiments, this temperature is 40° C. to 100° C. in order to facilitate the removal of solvent. In certain embodiments, the pressure is reduced to 3-30 inches Hg (10-100 kPa) in order to facilitate the removal of solvent. Solvent that is removed can be condensed and recovered for further use. In preferred embodiments, the solid purified rubber that is produced has a molecular weight of at least 800,000 (e.g., 800,000-1,500,000), even more preferably at least 1,000,000 (e.g., 800,000-1,500,000), molecular weight being based upon a polystyrene standard. The amount of solvent that is removed from the coagulated rubber will vary according to desired use and shipment method. In certain embodiments, solid purified rubber can be collected into bales. In preferred embodiments, no more than 2 weight %, preferably no more than 1 weight % and even more preferably no more than 0.8 weight % of volatile matter (based upon the total weight of the solid purified rubber) remains within the solid purified rubber after it has been subjected to one or more solvent removal steps. As previously discussed, according to certain embodiments of the processes described herein, when the solid purified rubber contains 0.8 weight % volatile matter, it will also contain 0.05-0.5 weight % dirt, 0.2-1.5 weight % ash and 0.1-4 weight % resin. (It should be understood that the solid purified rubber produced according to the processes disclosed herein may contain relatively more or less organic solvent, and that the 0.8 weight % volatile matter is provided as an exemplary content for purposes of determining whether sufficient removal of dirt, ash and resin has been achieved. In certain preferred embodiments, the solid purified rubber contains 0.8 weight % or less volatile matter.

In certain embodiments of the processes described herein, the amount of rubber that is removed from the slurry represents at least 95 weight % (e.g., 95-99% or 95-98%) of the rubber that is contained within the plant matter-containing slurry. Preferably, in such embodiments, the plant matter is from guayule shrubs. In certain more preferred embodiments of the processes described herein, the amount of rubber that is removed from the slurry represents at least 96 weight % (e.g., 96-99% or 96-98%) of the rubber that is contained within the plant matter-containing slurry. Preferably, in such embodiments, the plant matter is from guayule shrubs. In preferred embodiments of the processes described herein, the amount of rubber that is removed from the slurry represents at least 98 weight % of the rubber that is contained within the plant matter-containing slurry. Preferably, in such embodiments, the plant matter is from guayule shrubs. Total rubber present in the plant matter-containing slurry can be determined following a similar method as to that used to determine total bagasse present in the slurry, as discussed above, except focusing upon the supernatants obtained from repeated centrifuging and rinsing. After all bagasse has been removed from the slurry sample (using the repeated centrifuging and rinsing procedure described previously), the supernatant portions are collected together and the rubber within is coagulated by adding additional polar solvent (the resin will remain solubilized). Polar solvent should be added beyond the point at which coagulation begins to ensure coagulation of lower molecular weight rubber as well as higher molecular weight rubber. The coagulated rubber can then be filtered away from the solvents, rinsed with several additional pure polar solvent fractions (the rinse being added to the resin-containing solvent portion). After drying (to remove any remaining solvent), the rubber is weighed and the total amount of rubber in the original plant matter-containing slurry can be calculated. Total resin present in the plant matter-containing slurry can be determined by drying the solvent left behind after the rubber coagulates (adding in all additional polar solvent rinses used to rinse the coagulated rubber).

Temperature

As previously discussed, multiple aspects of the processes herein are conducted at a temperature or temperatures of 10-80° C. and different aspects of the process may be conducted at the same temperature or at different temperatures) and a pressure of 35-1000 kPa. In certain embodiments according to the processes disclosed herein, multiple aspects of the process are conducted at a temperature or temperatures of 10-50° C. (preferably those aspects of the process denoted as (a)-(e) in various embodiments herein and/or meeting the description of being prior to the stage where organic solvent is removed from coagulated rubber). As those skilled in the art will understand, the particular temperature or temperatures at which the individual aspects of the processes are conducted may vary depending upon the identity of the at least polar organic solvent and at least one non-polar organic solvent utilized. However, it is intended that those aspects of the processes disclosed herein that are directed to removing bagasse from the slurry to produce a miscella; adding additional polar organic solvent to produce a reduced viscosity miscella; removing 80-95 weight % bagasse from the reduced viscosity miscella (or the miscella) to form a purified miscella; and optionally treating the purified miscella to remove additional bagasse thereby producing a clarified rubber solution containing 0.01-1% by weight bagasse will be operated at a temperature or temperatures below the boiling point of the mixture of at least one polar organic solvent and at least one non-polar organic solvent utilized. Subsequent or later aspects of the processes (i.e., increasing the relative amount of polar organic solvent as compared to non-polar organic solvent within the clarified rubber solution so as to coagulate the rubber and producing solid purified rubber from the coagulated rubber) are preferably conducted at a temperature or temperatures above the boiling point of the at least one polar organic solvent and/or above the boiling point of the mixture of the at least one polar organic solvent and at least one non-polar organic solvent.

Multiple steps within each of the first and second embodiments of the processes described herein are preferably conducted on a continuous basis. In certain embodiments of the first and second embodiments of the processes described herein, (a)-(g) are conducted on a continuous basis.

EXAMPLES

The following examples are for purposes of illustration only and are not intended to limit the scope of the claims which are appended hereto.

Unless otherwise defined, all technical and scientific terms used herein have the same meaning as commonly understood by one of ordinary skill in the art to which the technology of this application belongs. While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative embodiments, and illustrative examples shown and described. Accordingly, departures may be made from such details without departing from the spirit or scope of the applicant's general inventive concept.

Example 1

Preparation of Briquettes

Approximately 150 pounds of 6-year old guayule shrub was harvested. The shrub was a premium variety (designated AZ-2) obtained from the U.S.D.A. in Maricopa, Ariz. Harvesting was performed by harvesting the portion of the guayule shrub growing above ground (i.e., roots were left behind). Thereafter, the shrubs were allowed to dry in the field for 15 days after cutting (ambient conditions were an average daily high of about 75° F. (about 24° C.) and average daily low of about 49° F. (about 9° C.) with very limited to no rainfall (less than 1"). After field drying, removal of leaves and soil was performed in the field by manual shaking of the shrubs. Thereafter, the shrub was rough chipped into pieces less than 2" in length (chips had an approximate diameter 0.25" to 0.125"). Some amount of undersize "fines" was also present in the rough chip mixture.

One week after the rough chips were prepared, they were loaded into a granulator (B&J Model BPV68-2) with a screen having openings of ¼" (6.4 mm). The smaller chips exiting the granulator were passed over a 20 mesh vibrating screen to remove undersize material. The chips remaining on the top of the 20 mesh screen were used for briquetting (described below). Briquette preparation occurred on the same day as mesh screening of the chips.

Analysis of the rough chipped material showed a moisture content of 15.5 wt %, an extractable rubber content of 1.6 wt % and an extractable resin content of 5.8 wt %. Analysis of the smaller chips (prior to the 20 mesh screen) showed a moisture content of 15.5 wt %, an extractable rubber content of 2.1 wt % and an extractable resin content of 7.6 wt % with a density of 2 pounds/gallon. Analysis of the small chips after the 20 mesh screen showed a moisture content of 15.8%, an extractable rubber content of 2.1 wt % and an extractable resin content of 6.3 wt %. The analysis of the moisture level of the smaller chips (both before and after the 20 mesh screen) was performed directly after the rough chips had been passed through the granulator. Analysis of the rubber and resin contents of the rough chipped material, granulated material and screened material was performed 2 weeks after rough chipping/1 week after granulating (with rough chip material having been reserved for analysis). Moisture content in samples was determined by drying the material in a forced-air oven at 110° C. for 5 hours. Determination of the % rubber and resin in samples was made using 9-10 gram samples of guayule material, soxhlet extracting for 6 hours with co-solvent (31 mL acetone, 170 mL pentane) to solubilize rubber and resin. Solubilized rubber (contained within the pentane phase) was isolated using methanol coagulation, centrifuging and drying. More specifically, 20 mL of the extract from the soxhlet extraction was transferred to a centrifuge tube and 20 mL of methanol was added to coagulate the rubber. The tube and its contents was centrifuged at 1500 rpm for 20 minutes to separate coagulated rubber from solvent. The supernatant within the tube was decanted into a flask and reserved for % resin determination. The tube and its coagulated rubber contents were rinsed with an aliquot of acetone (10 mL) and the acetone was poured out of the tube into the flask containing the decanted supernatant. The remaining coagulated rubber within the tube was then placed into a vacuum oven that had been pre heated to 60° C. and dried under vacuum for 30 minutes. After cooling to room temperature, the tube was weighed and the amount of rubber therein was calculated. Resin content (contained within the acetone phase) was determined by utilizing the flask containing the supernatant and decanted acetone. The solvent was evaporated from the flask in a fume hood until near dryness. The remaining contents were then further dried by placing the flask into an oven at 110° C. for 30 minutes. After cooling, the flask was weighed and the amount of resin remaining in the flask was calculated.

For the briquetting operation, 7 different batches of material were prepared. Each batch contained the small chipped guayule material (after 20 mesh screen) and some batches contained additional ingredients (as indicated in Table 1 below). As indicated in Table 1, two different types of commercially available briquetting machines were used. Each is manufactured by K.R. Komarek, Inc. (Wood Dale, Ill.) and is a roll-type briquetting machine. The B100R machine has a roll diameter of 130 mm and a width of 51 mm with 18 pockets (corrugations) upon the roll face. The machine was set for an initial roll gap of 0.6 mm. The BR200QC machine has a roll diameter of 305 mm and a width of 51 mm with 36 pockets (corrugations) upon the roll face. The machine was set for an initial roll gap of 0.4 mm.

Analysis for percentages moisture, resin and rubber in briquettes was performed 7 days after briquetting and results for batch number 2 briquettes was: 14.3 wt % moisture, 4.0 wt % rubber and 10.5 wt % resin. Samples of briquettes from batch numbers 2, 3 and 5 were also subjected to a hand grinding process using a mortar and pestle and then analyzed. Batch number 2 briquettes with hand grinding yielded 13.9 wt % moisture, 4.2 wt % rubber and 10.2 wt % resin and a density of 7 pounds/gallon. Batch number 3 briquettes with hand grinding yielded 11.7 wt % moisture, 4.2 wt % rubber and 10.9 wt % resin. Batch number 5 briquettes with hand grinding yielded 5.5 wt % moisture, 4.3 wt % rubber and 11.2 wt % resin.

TABLE 1

| Batch number | Machine utilized | Ingredients and conditions |
|---|---|---|
| 1 | Model B100R | Screened small chip material |
| 2 | Model B100R (adjusted roll torque and speed) | Screened small chip material |

TABLE 1-continued

| Batch number | Machine utilized | Ingredients and conditions |
|---|---|---|
| 3 | Model B100R (increased roll torque and speed) | Screened small chip material |
| 4 | Model B100R (same settings as batch 3) | Screened small chip material with 9 grams of Santoflex ® 134PD[1] sprayed onto 10 pounds of chip material |
| 5 | Model B220QC | Screened small chip material, sun dried for 2 hours |
| 6 | Model B220QC | Screened small chip material with 9 grams of Santoflex ® 134PD[1] sprayed onto 10 pounds of chip material, followed by sun drying for 2 hours |
| 7 | Model B220QC | Screened small chip material with 9 grams of Santoflex ® 134PD[1] sprayed onto 10 pounds of chip material, followed by sun drying for 2 hours |

[1]a liquid containing a blend of alkyl-aryl-p-phenylenediamines, available from Solutia (previously Flexsys).

Example 2

Processing of Briquettes (to Recover Rubber)

Ground briquette material was immersed in co-solvent (20% by volume acetone and 80% by volume hexane) with gentle agitation. Thereafter, the material (with solvent) was subjected to several rounds of centrifuging (using a swing bucket-type benchtop centrifuge) to obtain a clear miscella. Rubber contained within the miscella was precipitated by adding acetone (acetone was gradually added to the point that coagulation began and then 10% more acetone by volume was added). Precipitated (coagulated) rubber was dried at 40-100° C. and under vacuum (10-100 kPa) and molecular weight of the dried rubber was measured by GPC. For the GPC determination, the rubber was dissolved in THF and 2 Tosoh TSK Gel GMHx1 columns were utilizing. Calibration was with polystyrene standards and the polyisoprene values were calculated using Mark-Houwink coefficients.

Example 3

Aging of Briquettes

Briquettes made using guayule material treated according to various Batch number procedures (the treatment procedures were those described in Table 1 above). The resulting briquettes are indicated below in Table 2 (with BB # corresponding to the Batch number procedure from Table 1) were aged for various periods of time ranging from 7-91 days as indicated in Table 2 and tested according to the above procedure (hand grinding, acetone/hexane extraction, coagulation and m.w. using GPC) to determine the m.w. of the coagulated rubber obtained from each briquetting after various days of aging. Aging of the briquettes was conducted by storing the briquettes in loosely sealed plastic bags. The plastic bags were then stored in a plastic drum at room temperature. No direct light or air circulation was provided to the drum contents. As can be seen from an evaluation of the data in Table 2, treatment of the guayule material with antioxidant prior to briquetting (BB4, BB6 and BB7) provided significant advantages in terms of retention of molecular weight upon aging. Only those briquettes containing guayule material that had been treated with antioxidant prior to briquetting were able to maintain a m.w. of greater than $1 \times 10^6$ for the entire 91 days. BB7 briquettes retained a m.w. greater than $1 \times 10^6$ for 200 days and BB6 briquettes retained a m.w. greater than 800,000 for 200 days. (Apparent increases in molecular weight upon aging may be attributed to the small sample size (only 2 briquettes were crushed for each measurement and averaged values are reported in Table 2) and variations in the amount of acetone used to coagulate the rubber which can vary the relative amount of high molecular weight rubber that coagulates versus the amount of low molecular weight rubber that coagulates.)

TABLE 2

| Days after Briquetting | Molecular weight ($\times 10^6$) | | | | | |
|---|---|---|---|---|---|---|
| | Feed[1] | BB2 | BB3 | BB4 | BB5 | BB6 | BB7 |
| 7 | 1.040 | 0.931 | | | | | |
| 11 | | 1.029 | | | 0.245 | 1.353 | 1.284 |
| 21 | 1.058 | | 0.906 | | 0.272 | 1.761 | 1.597 |
| 28 | 0.966 | | 0.960 | 1.524 | 0.203 | 1.373 | 1.411 |
| 42 | 1.123 | | 1.007 | 1.180 | 0.111 | 1.266 | 1.171 |
| 56 | 1.039 | | 0.494 | 1.046 | 0.122 | 1.152 | 1.022 |
| 70 | 1.083 | | 0.459 | 1.311 | | 1.378 | 1.769 |
| 91 | 0.911 | | 0.480 | 1.300 | | 1.230 | 1.265 |
| 200 | | | | | | 0.873 | 1.004 |

[1]Feed material was the screened small chip material and rubber was extracted using the previously described acetone/hexane method of coagulation of rubber and GPC measurement of m.w.

Example 4

Use of a Decanter Centrifuge to Remove Bagasse/Fines from a Slurry

In order to simulate the removal of rubber from a non-Hevea or guayule source, slurries of varying concentration were prepared. Each slurry utilized a co-solvent mix of 80% weight hexane and 20% weight % acetone. To each slurry was added solids (consisting of insoluble fines, mainly bagasse and dirt/soil, from previous rubber harvesting of guayule shrub), rubber (obtained from coagulation of a natural rubber latex sourced from guayule shrubs), and resin (mixed soluble resin plus degraded rubber from previous harvesting of guayule shrub) in amounts sufficient to provide the slurry compositions summarized in Table 3.

TABLE 3

| (Guayule Slurry Composition) | | | |
|---|---|---|---|
| | % solids | % rubber | % resin |
| Slurry 1 | 20.8 | 3.4 | 1.6 |
| Slurry 2 | 10.2 | 3.6 | 1.6 |
| Slurry 3 | 7.2 | 3.8 | 1.6 |
| Slurry 4 | 5.2 | 3.7 | 1.6 |

Each slurry was individually fed into a decanter-type centrifuge (Westfalia Separator Model CA-225-21-000, available from GEA Westfalia Separator Group, Elgin, Ill.). Various flow rates were utilized for each slurry, ranging from 1.0 gallon/minute to 5.5 gallons/minute, as shown in Table 4. The decanter centrifuge utilized is commonly referred to as a bowl-type centrifuge because it has a bowl-like appearance, wherein the bowl allows solids to be lifted out of the liquid. Slurry enters the decanter through a central feed tube and flows into the distributor chamber. From the distributor chamber, the slurry moves through ports into the centrifugation space of the bowl where it is accelerated to operating speed. The centrifuge was set up with a differential speed set to 24 rpm and the ring dam was set to 130 millimeters; the operating bowl speed was 4750 rpm, equating to a g force of 2500. Upon operation, the solid materials adhere to the bowl wall by centrifugal force. Within the bowl is a scroll which operates at a slightly faster speed than the bowl shell, thereby continually conveying separated solids toward the narrow end of the bowl. Solids are discharged from the centrifuge through ports in the bowl shell, into the catch chamber of the housing and are ejected through a solids chute.

Samples were taken of the centrate (miscella) and solids discharge for each slurry feed and flow rate. Centrate and solids were analyzed for % fines and % solvent, respectively. A portion of the centrate from each of the slurries at each flow rate indicated in Table 6 was further treated to isolate the rubber contained therein by adding additional acetone until the rubber coagulated (generally rubber coagulation occurs at about 1.2:1 hexane/acetone weight ratio). The solvent was decanted off of the coagulated rubber and the wet rubber that remained was desolventized by drying in a vacuum oven at 70° C. Ash and dirt concentrations within the dried rubber samples were analyzed using ASTM D1278-91. Results are summarized in Table 4. The decanter centrifuge was able to remove more than 90% of the bagasse contained within each original slurry mixture, regardless of flow rate, and was also able to produce a solids content (indicated as % fines in Table 4) of less than 1% for each original slurry mixture, regardless of flow rate. Notably in many instances, the solids content of the miscella was less than 0.5 weight % or even less than 0.3 weight %. Changes in flow rates did not produce a consistent impact on the solvent content of the solids discharge.

TABLE 4

| % Fines in Slurry w/w % | Flow Rate (gallon/minute) & (liters/minute) | % Fines in Miscella w/w % | % Solvent in Solid Discharge w/w % | % Bagasse Removal w/w % | % Ash in Dry Rubber w/w % |
| --- | --- | --- | --- | --- | --- |
| 5.2 | 1.0 3.79 | 0.18 | 69.3 | 96[1] | 1.05 |
|  | 2.0 7.57 | 0.24 | 65.3 |  | 1.14 |
|  | 3.0 11.36 | 0.26 | 62.7 |  | 1.14 |
| 7.2 | 5.5 20.82 | 0.27 | 54.9 | — | 1.20 |
|  | 4.5 17.03 | 0.40 | 56.3 |  | 1.22 |
| 10.2 | 1.0 3.79 | 0.31 | 56 | 97[1] | — |
|  | 2.0 7.57 | 0.29 | 54.4 |  | 2.19 |
|  | 3.0 11.36 | 0.37 | 60.2 |  | 1.37 |
| 20.8 | 3.0 11.36 | 0.56 | 53.8 | — | 1.56 |

[1]Percentages can be considered as an average from the three flow rates.

Example 5

Hammer Milling, Roll Milling/Cracking and Flaking (Flake Milling)

Guayule shrub approximately 8-36 months old was harvested and bundled into bales. The bales were measured to have a moisture content of about 20-25%. Bales were fed to a standard wood chipper to reduce the guayule material into approximately 1" sticks. The shredded sticks of guayule were fed through a hammer mill by hand for further size reduction. The hammer mill then air conveyed the milled shrub through a fan to a cyclone separator. Varied screen sizes for the hammer mill (1", ½", ⅛", and 1/16") were used. The milled shrub was collected in bins and weighed as it was being produced.

All of the shrub was processed through a Sweco screener with a 20 mesh screen. The screener was used to remove fines from the shrub. It was tested before and/or after milling.

The milled shrub was processed in a cracker (also known as a roller mill), set up to have a differential roll speed of 1:1.1. The roll spacing on the cracker was adjustable. The cracker was fed using a vibratory screen feeder and the cracked material was collected in bins.

The cracked material was transferred to a flaker. The flaker had its own roll feeder, a differential roll speed of 1:1.25 and the roll spacing was set at 0.012". Samples of the flaked material were taken and retained for cell rupture analysis and for initial shrub rubber content. Some of the flaked material was retained to be run through the flaker a second and a third time. The flaked material was collected in bins and weighed. The final flaked material was refrigerated until it was ready to be extracted.

Determination of the % rubber and resin in samples was made using 9-10 gram samples of guayule material, soxhlet extracting for 6 hours with co-solvent (31 mL acetone, 170 mL pentane) to solubilize rubber and resin. Solubilized rubber (contained within the pentane phase) was isolated using methanol coagulation, centrifuging and drying. More specifically, 20 mL of the extract from the soxhlet extraction was transferred to a centrifuge tube and 20 mL of methanol was added to coagulate the rubber. The tube and its contents was centrifuged at 1500 rpm for 20 minutes to separate coagulated rubber from solvent. The supernatant within the tube was decanted into a flask and reserved for % resin determination. The tube and its coagulated rubber contents were rinsed with an aliquot of acetone (10 mL) and the acetone was poured out of the tube into the flask containing the decanted supernatant. The remaining coagulated rubber within the tube was then placed into a vacuum oven that had been pre heated to 60° C. and dried under vacuum for 30 minutes. After cooling to room temperature, the tube was weighed and the amount of rubber therein was calculated. Resin content (contained within the acetone phase) was determined by utilizing the flask containing the supernatant and decanted acetone. The solvent was evaporated from the flask in a fume hood until near dryness. The remaining contents were then further dried by placing the flask into an oven at 110° C. for 30 minutes. After cooling, the flask was weighed and the amount of resin remaining in the flask was calculated. Results are provided in Table 5 below.

TABLE 5

| Conditions | Avg. % Moisture | Avg. % Rubber (Dry Weight Base) | Avg. % Resin (Dry Weight Base) |
| --- | --- | --- | --- |
| Shredded & Hammermilled ½" | 26.79 | 2.34 | 6.70 |
| Shredded & Hammermilled ⅛" | 22.29 | 3.12 | 6.78 |
| Shredded & Hammermilled ⅛" | 19.67 | 4.98 | 6.96 |

TABLE 5-continued

| Conditions | Avg. % Moisture | Avg. % Rubber (Dry Weight Base) | Avg. % Resin (Dry Weight Base) |
|---|---|---|---|
| & 20 mesh screened & flaked | | | |
| Shredded & Hammermilled 1/8" & 20 mesh screened & three passes flaked | 19.52 | 5.61 | 7.33 |

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus, and illustrative examples shown and described. Accordingly, departures may be made from such details without departing from the spirit or scope of the applicant's general inventive concept.

What is claimed is:

1. An aged briquette comprising:
    78 to 95 weight % compressed chopped plant matter (based upon the total weight of the briquette) from a non-*Hevea* plant, said plant matter comprising bagasse, rubber, and resin,
    2-20 weight % water (based upon the total weight of the briquette),
    0.2-2 weight % antioxidant (based upon the total weight of rubber present in the plant matter),
    0.1-5 weight % binder (based upon the total weight of the briquette), and
    wherein at least 90% of undersize material of less than 30 mesh has been removed from the chopped plant matter prior to briquetting and the briquette has been aged for 18-24 days after formation and the rubber within the briquette has a molecular weight of 1,000,000-1,500,000, as measured after organic solvent extraction of the rubber from the plant matter of the briquette.

2. The briquette of claim 1, wherein the rubber within the briquette has a molecular weight of 1,200,000-1,500,000, as measured after organic solvent extraction of the rubber from the plant matter of the briquette.

3. The briquette of claim 1, wherein the briquette contains 80-100% by weight bark, less than 20% by weight woody material, and less than 1% by weight leaves.

4. The briquette of claim 1, wherein the chopped plant matter has an average size of 0.065-0.5" prior to being compressed into the briquette.

5. The briquette of claim 1, wherein the chopped plant matter of the briquettes comprises guayule plant matter.

6. The briquette of claim 1, wherein the briquette has been subjected to further aging for a total aging period of 90-200 days after formation, optionally with at least half of those days at a temperature of 20-50° C., and the rubber within the briquette has a molecular weight of 900,000-1,200,000.

7. The briquette of claim 1, wherein the amount of the antioxidant is 0.5-2 weight %.

8. The briquette of claim 1, wherein the chopped plant matter was roll/flake milled prior to being compacted into the briquette.

9. The briquette of claim 5, wherein the briquette contains 80-100 % by weight bark, less than 20% by weight woody material, and less than 1% by weight leaves.

10. An aged briquette comprising:
    78 to 95 weight % compressed chopped plant matter (based upon the total weight of the briquette) from a guayule plant, said plant matter comprising bagasse, rubber, and resin,
    2-20 weight % water (based upon the total weight of the briquette),
    0.2-2 weight % antioxidant (based upon the total weight of rubber present in the plant matter),
    0.1-5 weight % binder (based upon the total weight of the briquette),
    wherein at least 90% of undersize material of less than 30 mesh has been removed from the chopped plant matter prior to briquetting and the briquette has been aged for 18-24 days after formation and the rubber within the briquette has a molecular weight of 1,000,000-1,500,000, as measured after organic solvent extraction of the rubber from the plant matter of the briquette.

11. The briquette of claim 10, wherein the rubber within the briquette has a molecular weight of 1,200,000-1,500,000, as measured after organic solvent extraction of the rubber from the plant matter of the briquette.

12. The briquette of claim 10, wherein the briquette contains 80-100% by weight bark, less than 20% by weight woody material, and less than 1% by weight leaves.

13. The briquette of claim 10, wherein the chopped plant matter has an average size of 0.065-0.5" prior to being compressed into the briquette.

14. The briquette of claim 10, wherein the briquette has been subjected to further aging for a total aging period of 90-200 days after formation, optionally with at least half of those days at a temperature of 20-50° C., and the rubber within the briquette has a molecular weight of 900,000-1,200,000.

15. The briquette of claim 10, wherein the amount of the antioxidant is 0.5-2 weight %.

16. The briquette of claim 10, wherein the chopped plant matter was roll/flake milled prior to being compacted into the briquette.

17. The briquette of claim 11, wherein the briquette contains 80-100% by weight bark, less than 20% by weight woody material, and less than 1% by weight leaves.

18. An aged briquette comprising:
78 to 95 weight % compressed chopped plant matter (based upon the total weight of the briquette) from a guayule plant, said plant matter comprising bagasse, rubber, and resin,
2-20 weight % water (based upon the total weight of the briquette), and
0.2-2 weight % antioxidant (based upon the total weight of rubber present in the plant matter),
wherein at least 90% of undersize material of less than 30 mesh has been removed from the chopped plant matter prior to briquetting and the briquette has been aged for 18-24 days after formation and the rubber within the briquette has a molecular weight of 800,000-1,500,000, as measured after organic solvent extraction of the rubber from the plant matter of the briquette.

19. The briquette of claim 18, wherein the rubber within the briquette has a molecular weight of 1,000,000-1,500,000, as measured after organic solvent extraction of the rubber from the plant matter of the briquette.

20. The briquette of claim 18, wherein the rubber within the briquette has a molecular weight of 1,200,000-1,500,000, as measured after organic solvent extraction of the rubber from the plant matter of the briquette.

21. The briquette of claim 18, wherein the rubber within the briquette has a molecular weight of 1,000,000-1,200,000, as measured after organic solvent extraction of the rubber from the plant matter of the briquette.

* * * * *